(12) United States Patent
Perlman et al.

(10) Patent No.: US 7,575,768 B2
(45) Date of Patent: Aug. 18, 2009

(54) DIETARY SUPPLEMENTS AND PREPARED FOODS CONTAINING TRIGLYCERIDE-RECRYSTALLIZED NON-ESTERIFIED PHYTOSTEROLS

(75) Inventors: Daniel Perlman, Arlington, MA (US); Kenneth Hayes, Wellesley, MA (US); Andrzej Pronczuk, Boston, MA (US)

(73) Assignee: Brandeis University, Waltham, MA (US)

( * ) Notice: Subject to any disclaimer, the term of this patent is extended or adjusted under 35 U.S.C. 154(b) by 644 days.

(21) Appl. No.: 11/222,512

(22) Filed: Sep. 7, 2005

(65) Prior Publication Data

US 2007/0054028 A1 Mar. 8, 2007

(51) Int. Cl.
A23D 9/07 (2006.01)
A61K 47/44 (2006.01)
(52) U.S. Cl. .......................... 426/2; 426/601; 426/611; 426/607; 424/439
(58) Field of Classification Search ................ 426/2, 426/611, 607; 424/439
See application file for complete search history.

(56) References Cited

U.S. PATENT DOCUMENTS

| | | | |
|---|---|---|---|
| 3,881,005 | A | 4/1975 | Thakkar et al. |
| 4,195,084 | A | 3/1980 | Ong |
| 5,244,887 | A | 9/1993 | Straub |
| 5,419,925 | A | 5/1995 | Seiden et al. |
| 5,502,045 | A | 3/1996 | Miettinen et al. |
| 5,932,562 | A | 8/1999 | Ostlund, Jr. |
| 5,952,393 | A | 9/1999 | Sorkin et al. |
| 5,998,396 | A | 12/1999 | Nakano et al. |
| 6,025,348 | A | 2/2000 | Goto et al. |
| 6,031,118 | A | 2/2000 | Van Amerongen et al. |
| 6,106,886 | A | 8/2000 | Van Amerongen et al. |
| 6,129,944 | A | 10/2000 | Tiainen et al. |
| 6,139,897 | A | 10/2000 | Goto et al. |
| 6,214,534 | B1 | 4/2001 | Horowitz et al. |
| 6,267,963 | B1 | 7/2001 | Akashe et al. |
| 6,391,370 | B1 | 5/2002 | Rogers et al. |
| 6,491,952 | B1 | 12/2002 | Sjoberg |
| 6,531,463 | B1 | 3/2003 | Yliruusi et al. |
| 6,638,547 | B2 | 10/2003 | Perlman et al. |
| 6,933,291 | B2 | 8/2005 | Qi et al. |
| 6,998,501 | B1 | 2/2006 | Wright et al. |
| 7,144,595 | B2 * | 12/2006 | Perlman et al. .............. 426/611 |
| 2001/0034338 | A1 | 10/2001 | Sorkin, Jr. |
| 2005/0032757 | A1 | 2/2005 | Cho |
| 2005/0042355 | A1 | 2/2005 | Perlman et al. |

FOREIGN PATENT DOCUMENTS

| | | |
|---|---|---|
| WO | WO 99/43218 | 9/1999 |
| WO | WO 00/04887 | 2/2000 |
| WO | WO 01/32029 | 5/2001 |
| WO | WO 03/043433 | 5/2003 |

OTHER PUBLICATIONS

Farquhar et al., The Effect of Beta Sitosterol on the Serum Lipids of Young Men with Arteriosclerotic Heart Disease, Circulation, 14:77-82, (1956).
Gertz, et al., "Testing and Comparing Oxidative Stability of Vegetable Oils and Fats at Frying Temprerature", Eur. J. Lipid Sci. Technol., 102:543-551, (2000).
Hayes, et al., Nonesterified Phytosterols Dissolved and Recrystalized in Oil Reduce Plasma Cholesterol in Gerbils and Humans, J. Nutr. 134:1395-1399, (2004).
Jones et al., Cholesterol-lowering efficacy of a sitostanol-containing phytosterol mixture with a prudent diet in hyperlipidemic men, Am. J. Clin. Nutr. 69:1144-1150, (1999).
Kim and Chung, Direct Determination of the Free Cholesterol and Individual Cholesteryl Esters in Serum by High Pressure Liquid Chromotography, Korean J. Biochem. 16: 69-77, (1984).
Kudchodkar et al., Effects of Plant Sterols on Cholesterol Metabolism in Man, Atherosclerosis 23:239-248, (1976).
Lees et al., Plant Sterols as Cholesterol-Lowering Agents: Clinical Trials in Patients With Hypercholesterolemia and Studies of Sterol Balance, Atherosclerosis 38:325-333, (1977).
Normen et al., Combination of Pnytosterols and Omega-3 Fatty Acids: A Potential Strategy to Promote Cardiovascular Health, Cardiovascular and Hematological Agents, 2:1-12, (2004).
Ntanios et al., Dietary sitostanol reduces plaque formation but not lecithin cholesterol acyl transferase activitiy in rabbits, Atherosclerosis, 138: 101-110, (1998).
Ntanios and Jones, Effects of variable dietary sitostanol concentrations on plasma lipid profile and phytosterol metabolism in hamsters, Biochim Biophys Acta, 1390: 237-244, (1998).
Plat et al., Therapeutic potential of plant sterols and stanols, Current Opinion in Lipidology, 11: 571-576, (2000).
Wang, et al., "Antioxidant Activity of Phystosterols, Oryzanol, and Other Phytosterol Conjugates", JAOCS, 79(12):1201-1206, (2002).
Weingard and Daggy, Quantification of High-Density-Lipoprotein Cholesterol in Plasma from Hamsters by Differential Precipitation, Clin. Chem. 36: 575-577, (1990).

(Continued)

Primary Examiner—Carolyn A Paden
(74) Attorney, Agent, or Firm—Foley & Lardner LLP

(57) ABSTRACT

A nutritional supplement, prepared food product, or direct food additive for ingestion by mammals, and methods for preparing such products, are provided. Products of the invention comprise an oxidation-resistant fat-based composition substantially free of exogenous solubilizing and dispersing agents for phytosterols. The fat-based composition includes greater than 25% and less than 75% by weight of one or more triglyceride-based edible oil or fat, and greater than 25% and less than 75% by weight of one or more non-esterified phytosterols. The fat-based composition, when exposed to air, contains a reduced amount of oxidative by-products compared to a similar fat-based composition lacking non-esterified phytosterols. Also provided are methods for reducing plasma cholesterol in mammals, and methods for protecting plasma lipoproteins and cholesterol from oxidation by ingestion of products of the invention.

46 Claims, No Drawings

OTHER PUBLICATIONS

White, Pamela J. and Armstrong, Lillian S., "Effect of Selected Oat Sterols on the Deterioration of Heated Soybean Oil", *JAOCS*, 63(4):525-529, (1986).

Witztum et al., Cholestyramine-induced changes in low density lipoprotein composition and metabolism. I. Studies in the guinea pig, J. Lipid Res. 26:92-103, (1985).

Yanishlieva et al., "Effect of Sitosterol on Autoxidation Rate and Product Composition in a Model Lipid System", *J. Sci. Food Agric.*, 35:219-224, (1983).

Engel and Schubert, Formulation of phytosterols in emulsions for increased dose response in functional foods. Innovative Food Science and Emerging Technologies, 6:233-237, 2005.

Ewart et al., Fish oil containing phytosterol esters alters blood lipid profiles and left ventricle generation of thrombozane $A_2$ in adult guinea pigs. J. Nutrition, 132:1149-1152, 2002.

Quilez et al., Potential uses and benefits of phytosterols in diet: present situation and future directions. Clinical Nutrition, 22(4): 343-351, 2003.

International Search Report for PCT Patent Application No. PCT/US2006/034776.

* cited by examiner

US 7,575,768 B2

DIETARY SUPPLEMENTS AND PREPARED FOODS CONTAINING TRIGLYCERIDE-RECRYSTALLIZED NON-ESTERIFIED PHYTOSTEROLS

CROSS-REFERENCE TO RELATED PATENT APPLICATIONS

This application is related to the following: U.S. application Ser. No. 10/677,634, filed Oct. 1, 2003, and published as U.S. Pat. App. Pub. 2005-0042355, Feb. 24, 2005; now U.S. Pat. No. 7,144,595 PCT Application PCT/US02/36809, filed Nov. 14, 2002, and published as WO 2003/043433, May 30, 2003; U.S. application Ser. No. 10/295,929, filed Nov. 14, 2002, which published as U.S. Pat. App. Pub. 2003-0096035, May 22, 2003, and which issued as U.S. Pat. No. 6,638,547, Oct. 28, 2003; and U.S. Provisional Application No. 60/332,434, filed Nov. 16, 2001, now abandoned, each of which is incorporated herein by reference in its entirety, including all figures and tables and for all purposes.

BACKGROUND OF THE INVENTION

The present invention relates to dietary supplements and prepared foods fortified with non-esterified phytosterols that have been recrystallized with fats or oils that are essentially free of emulsifiers and the like, and to the utility of such Triglyceride-Recrystallized Phytosterols (TRPs) for reducing rancidity development in fat-containing foods, stabilizing perishable triglycerides such as those found in fish oil, and stabilizing heated fats and oils against oxidation. The present invention also relates to the surprising bioavailability of TRPs provided in the mammalian diet, resulting in a substantial decrease in plasma LDL cholesterol levels.

It has been a widely held belief that to obtain appreciable benefit from phytosterols, i.e., by definition herein, including plant sterols, stanols, or combinations thereof [including beta-sitosterol, beta-sitostanol, campesterol, campestanol, stigmasterol, stigmastanol, brassicasterol, brassicastanol, clionasterol and clionastanol (collectively termed phytosterol or phytosterols)] for lowering plasma cholesterol, the phytosterol should be dissolved in an edible oil or other solvent so that it can enter micelles in the small intestine to inhibit the absorption of cholesterol.

This belief has been supported by early research carried out in the 1950s through the 1970s showing that large doses of phytosterols in their solid form, i.e., coarse particles, were required to achieve meaningful decreases in plasma cholesterol levels. For example, in 1956, Faquhar et al., (*Circulation*, 14, 77-82, 1956) showed that doses of 12-18 g per day of beta sitosterol (provided in divided doses) were required to achieve a 15-20% lowering of serum cholesterol in males with atherosclerosis. In another study, 9 g per day (3 g t.i.d.) of soybean-derived phytosterols were required to lower plasma cholesterol approximately 9% (Kucchodkar et al., *Atherosclerosis* 23:239-248, 1976). In yet another study, 3-9 g per day of tall oil-derived phytosterols were required to lower plasma cholesterol approximately 12% (Lees et al., *Atherosclerosis* 28:325-333, 1977). In a recent study, 1.7 g per day of finely powdered tall oil-derived phytosterols were sufficient to lower total plasma cholesterol by 9% and LDL-cholesterol by about 15% (Jones et al., *Am. J. Clin. Nutr.* 69: 1144-1150, 1999).

It has been generally appreciated that phytosterols such as alpha- and beta-sitosterol, stigmosterol, campesterol and others, including the corresponding saturated (chemically reduced or hydrogenated) "stanol" species, are insoluble in water, and only slightly soluble in edible oils. Accordingly, to promote the solubilization of phytosterols, and their efficacy in lowering plasma cholesterol, U.S. Pat. No. 6,025,348 by Goto et al. describes the incorporation of at least 15% and as much as 70% by weight or more of a polyhydric alcohol/fatty acid ester (including glycerol fatty acid esters containing at least two esterified and at least one unesterified hydroxyl group such as diacylglycerols or diglycerides), into a fat. Between 1.2% and 4.7% by weight of phytosterol is incorporated into the polyhydric alcohol/fatty acid ester containing fat composition.

Perlman et al. in U.S. application Ser. No. 10/677,634, filed Oct. 1, 2003, and published as U.S. Pat. Appl. Pub. 2005-0042355, Feb. 24, 2005, describes a prepared food product which comprises an oxidation-resistant fat-based composition substantially free of exogenous solubilizing and dispersing agents for phytosterols, wherein the fat-based composition includes between 75% and 98% by weight of at least one triglyceride-based edible oil or fat, and between 2% and 25% by weight of non-esterified phytosterols in the form of triglyceride-recrystallized phytosterols (TRPs). Further discussed is a method for producing a fried snack food having reduced surface oiliness, comprising frying said snack food in a fat-based composition comprising at least one triglyceride-based edible oil or fat, and 2% to 25% by weight of non-esterified phytosterols. Further discussed are methods of preparing a TRP-containing fat-based composition comprising not more than 98% by weight of edible fat or oil and 2% to 25% by weight of non-esterified phytosterols in the form of TRPs, wherein the method comprises heating the fat-based composition for sufficient time and temperature to dissolve said non-esterified phytosterols, and cooling said composition to room temperature. Further discussed is a dietary supplement comprising at least one triglyceride-based edible fat; and between 3% and 50% by weight of triglyceride recrystallized phytosterols.

Perlman et al. in U.S. Pat. No. 6,638,547, issued Oct. 28, 2003, disclose and claim a prepared food product for ingestion by mammals, comprising an oxidation-resistant fat-based composition substantially free of exogenous solubilizing and dispersing agents for phytosterols, comprising between 75% and 98% by weight of at least one triglyceride-based edible oil or fat, between 2% and 25% by weight TRPs, wherein said fat-based composition has been partially oxidized by an interval of exposure to air, or by an interval of heating in air, and contains a reduced amount of oxidative by-products compared to a similar fat-based composition lacking said non-esterified phytosterols. Also disclosed are a reduced calorie prepared food product comprising between 75% and 98% by weight of at least one triglyceride-based edible oil or fat, between 2% and 25% by weight TRPs, wherein said non-esterified phytosterols are calorie-free and substitute for a portion of triglyceride-based edible oil or fat normally absorbed or otherwise incorporated into a prepared food product. Also disclosed are an oxidation-resistant frying or baking shortening comprising from 75% to 98% by weight of at least one edible triglyceride-based fat or oil; and from 2.0% to 25.0% by weight of TRPs. Also provided is a method for reducing plasma cholesterol levels in mammals, comprising regularly providing and ingesting a heat-processed food containing a fat-based composition comprising between 75% and 97% by weight of at least one triglyceride-based edible fat or oil, and at least 3% by weight of non-esterified TRPs, wherein the fat-based composition is substantially free of exogenous phytosterol-solubilizing and dispersing agents, and wherein said TRPs when ingested are essentially as effective as fat-soluble esterified phytosterols in reducing said plasma cholesterol levels. Also provides are methods of preparing TRP-containing fat-based compositions comprising providing a triglyceride-based edible fat-containing composition comprising between 2% and 25% by weight of non-esterified phytosterols and not more than 98% by weight of edible fat or oil, wherein said composition is substantially free of exogenous phytosterol-solubilizing and dispersing agents, heating said composition to dissolve said non-esterified phytosterols, and cooling said composition to room temperature. Also provided are methods of preparing non-esterified phytosterol-fortified prepared foods comprising providing an edible fat-based composition comprising between 2% and 25% by weight of non-esterified phytosterols and between 75% and 98% by weight of at least one edible fat or oil, wherein said composition is substantially free of exogenous phytosterol-solubilizing and dispersing agents, and other ingredients, if any, for said prepared food; cooking or otherwise heating said ingredients with said composition to allow said non-esterified phytosterols to dissolve in said oil or fat and enter or become integrated into said food product, and cooling said food product to room temperature to allow formation of triglyceride-recrystalized phytosterols (TRPs) in said composition within said prepared food.

Perlman et al. in PCT/US2002/036809, filed Nov. 14, 2002, and published as WO 2003/043433, May 30, 2003, provide a prepared food product for ingestion by mammals, comprising an oxidation-resistant fat-based composition substantially free of exogenous solubilizing and dispersing agents for phytosterols, comprising between 75% and 98% by weight of at least one triglyceride-based edible oil or fat, and between 2% and 25% by weight of non-esterified TRPs, wherein said fat-based-composition has been partially oxidized by an interval of exposure to air, or by an interval of heating in air, and contains a reduced amount of oxidative by-products compared to a similar fat-based composition lacking said non-esterified phytosterols. Further provided is a reduced calorie prepared food product comprising between 75% and 98% by weight of at least one triglyceride-based edible oil or fat, and between 2% and 25% by weight TRPs, wherein said non-esterified phytosterols are calorie-free and substitute for a portion of triglyceride-based edible oil or fat normally absorbed or otherwise incorporated into a prepared food product. Further provided is an oxidation-resistant flying or baking shortening comprising from 75% to 98% by weight of at least one edible triglyceride-based fat or oil; and from 2.0% to 25.0% by weight of TRPs. Further provided is a method for reducing plasma cholesterol levels in mammals, comprising regularly providing and ingesting a heat-processed food containing an edible fat-based composition comprising between 75% and 97% by weight of at least one triglyceride-based edible fat, and at least 3% by weight of non-esterified TRPs, wherein the fat-based composition is substantially free of exogenous phytosterol-solubilizing and dispersing agents, and wherein said TRPs when ingested are essentially as effective as fat-soluble esterified phytosterols in reducing said plasma cholesterol levels. Further provided is a method of preparing a TRP-containing fat-based composition comprising the following: providing a triglyceride-based edible fat-containing composition which in turn comprises between 2% and 25% by weight of non-esterified phytosterols and not more than 98% by weight of edible fat or oil, and wherein said composition is substantially free of exogenous phytosterol-solubilizing and dispersing agents; heating said composition to dissolve said non-esterified phytosterols; and cooling said composition to room temperature. Also provided is a method of preparing non-esterified phytosterol-fortified prepared foods comprising the following: providing an edible fat-based composition comprising between 2% and 25% by weight of non-esterified phytosterols and between 75% and 98% by weight of at least one edible fat or oil, wherein said composition is substantially free of exogenous phytosterol-solubilizing and dispersing agents, and other ingredients, if any, for said prepared food; cooking or otherwise heating said ingredients with said composition to allow said non-esterified phytosterols to dissolve in said oil or fat and enter or become integrated into said food product, and cooling said food product to room temperature to allow formation of TRPs in said composition within said prepared food.

U.S. Pat. No. 6,139,897 by Goto et al. describes an oil or fat composition containing 80% or more diacylglycerol and up to 20% phytosterol. The high proportion of diacylglycerol assures solubility or dispersal of the phytosterol to provide a cholesterol-lowering fat substitute.

U.S. Pat. No. 5,998,396 by Nakano et al., describes an edible oil containing a phytosterol, vitamin E, and an emulsifier rendering the phytosterol soluble in both the vitamin E and the edible oil.

U.S. Pat. No. 5,419,925 by Seiden et al. describes a reduced calorie fat composition based upon a substantially non-digestible polyol fatty acid polyester plus reduced calorie medium chain triglycerides and other reduced calorie fats or noncaloric fat replacements including plant sterol esters that are soluble in such fat compositions. Free fatty acids, vitamin E and tocotrienol have each been utilized by other inventors to promote the solubilization of phytosterols in fats and oils, with the expectation that the cholesterol lowering properties of various phytosterols would be improved.

U.S. Pat. No. 5,244,887 by Straub describes the preparation of a cholesterol-lowering food additive composition with plant stanols, including: (i) an edible carrier such as an oil, monoglyceride, diglyceride, triglyceride, tocopherol, alcohol or polyol, (ii) an antioxidant and (iii) a dispersant or detergent-like material such as lecithin, or other phospholipids, sodium lauryl sulfate, a fatty acid, salts of fatty acids, or a fatty acid ester. Straub cites research showing that 1.5 grams per day of a stanol mixture derived from soybean sterols lowered blood cholesterol by 15% after 4 weeks of therapy, and believes that these stanols are preferred to sterols based upon less stanol absorption from the G.I. tract and better heat stability in air than sterols.

U.S. Pat. No. 5,932,562 by Ostlund, Jr. describes an aqueous micellar mixture of plant sterol and lecithin (in a 1:1 to 1:10 mole ratio) which has been dried to a water soluble powder and which is useful as a food additive for reducing cholesterol absorption.

U.S. Pat. No. 4,195,084 by Ong describes a taste-stabilized pharmaceutical suspension of sitosterols to reduce hypercholesterolemia, in which the suspension includes the plant sterol, a chelator such as calcium disodium EDTA, a surfactant and other ingredients to assure suspension and dispersal of the phytosterol.

U.S. Pat. No. 3,881,005 by Thakkar et al. describes a pharmaceutical dispersible powder for oral administration in which sitosterols are combined with any one of a variety of excipients, and any one of a variety of pharmaceutically acceptable surfactants.

U.S. Pat. No. 6,267,963 by Akashe et al. describes a plant sterol/emulsifier complex that has a lower melting temperature than the plant sterol alone. The complex, e.g., a co-crystallized monoglyceride and plant sterol mixture, is said to facilitate incorporation of the sterol into food products without adversely affecting the texture of the food products.

As indicated above, it has been widely believed that increasing the solubility of phytosterols in fat increases their bioavailability and reduces the dose required to achieve a specified degree of cholesterol reduction. Thus, U.S. Pat. No. 5,502,045 by Miettinen et al., describes the preparation and use of the plant stanol, beta sitostanol, in the form of a fatty acid ester which is readily soluble in an edible oil, to reduce the serum cholesterol level in humans. This technology has been utilized in manufacturing the margarine product marketed under the tradename Benecol®.

U.S. Pat. Nos. 6,031,118 and 6,106,886 by van Amerongen et al. describe similar stanol fatty acid esters but provide different and reportedly improved chemical methods for their preparation. Plant sterols (from soybean oil) have also been interesterified with fatty acid esters to produce the margarine marketed under the tradename Take Control®. Clinical studies suggest that with mildly hypercholesterolemic individuals, dietary intake of between 1.5 and 3 grams per day of the free phytosterol (provided in a fatty acid esterified form) is required to decrease plasma cholesterol approximately 15%.

U.S. Pat. No. 5,932,562 by Ostlund, Jr. points out that cholesterol is absorbed from an intestinal micellar phase containing bile salts and phospholipids which is in equilibrium with an oil phase inside the intestine. Prior to recent experiments, delivery of phytosterol as a solid powder or aqueous suspension was thought to not be preferred because of the limited rate and extent of solubility in intestinal liquid phases. In fact, at least two earlier human studies showed that as much as 9-18 grams of sitosterol per day were required to decrease the plasma cholesterol level by approximately 15% when the sitosterol was provided in a coarse powdered (rather than soluble) form. Yet, esterification of phytosterols, coupled with the use of edible oils to deliver these sterols is not always practical, e.g., in formulating fat-free foods. It is in this context that Ostlund, Jr. provides a water-dispersible mixture of plant sterol and lecithin.

Using a finely milled powdered form of free phytosterols (from tall oil) suspended in a margarine (not fully dissolved or recrystallized in fat), Jones et al. have described cholesterol reduction in hypercholesterolemic humans (Jones et al., *Am J Clin Nutr* 69: 1144-1150, 1999) and other mammals (Ntanios et al., *Atherosclerosis*, 138: 101-110, 1998; Ntanios et al., *Biochim Biophys Acta*, 1390: 237-244, 1998). In these studies, the efficacy based on cholesterol reduction appears to be equal to that of phytosterol and stanol esters reported by others.

Still another method of producing a fine suspension of microparticulate phytosterols in fat and water has been described by Yliruusi, et al. in U.S. Pat. No. 6,531,463. The method involves first heating and dissolving beta-sitosterol in a fat or oil, and then precipitating the phytosterol with water to form a microcrystalline suspension of phytosterol particles in a mixture of fat and water. While this process appears more cost-effective than grinding, emulsification of fat with water causes any fat to become susceptible to oxidation and necessitates refrigeration.

The production of microparticulate phytosterols described in the relevant literature involves increased cost and inconvenience, e.g., the use of grinding, and can result in a mixed emulsified product that is more susceptible to oxidation and rancidity, particularly when an aqueous fat-phytosterol emulsion is involved. In fact, there are limitations and disadvantages inherent in most of the methods of phytosterol preparation and delivery described above. These methods have included grinding, formation of fat and water mixed phytosterol emulsions, chemical modification of phytosterols, e.g., esterification, and mixing of phytosterols with substantial amounts of specialized solubilizing and dispersing agents.

A recent review article entitled "Therapeutic potential of plant sterols and stanols" (Plat et al., *Current Opinion in Lipidology*, 11: 571-576, 2000) has summarized the results of a number of independent clinical studies in which human plasma cholesterol levels were monitored before and after ingestion of food products enriched with plant sterols and sterol esters (approximately 2-2.5 g per day). The authors conclude that LDL cholesterol levels decreased significantly, i.e., an average of 10-14%, under this regimen.

The description above is provided to assist the understanding of the reader, and does not constitute an admission that the cited references are prior art to the present invention.

SUMMARY OF THE INVENTION

The present invention concerns the use of non-esterified phytosterols in formulating fat-containing dietary supplements and direct food additives, and in fortifying prepared foods. Non-esterified phytosterols were found to have the unexpected property of decreasing the oxidation of fats used in these supplements and prepared foods, particularly the oxidation of triglycerides containing polyunsaturated fatty acids including linoleic and alpha-linolenic acid and also the more perishable fatty acids found in fish oil, e.g. DHA and EPA, as well as decreasing the rate of triglyceride oxidation caused by heating, e.g., during frying and baking. It is believed that non-esterified phytosterols described herein are able to protect polyunsaturated fatty acid moieties in fats by quenching, i.e., scavenging, oxidative free radicals and/or peroxides and hydroperoxides that are formed during exposure of triglycerides to air, and that are particularly problematic in heated fats. Thus, in addition to their ability to function as a plasma cholesterol-lowering neutraceutical ingredient in dietary supplements and prepared foods, phytosterols can actually protect fats against oxidation during cooking and shelf storage.

An unanticipated finding emerged recently from analyses of human plasma samples that Applicants obtained during a clinical study in which subjects consumed non-esterified phytosterols (TRPs) incorporated into tortilla chips over a 4 week period (see Example 7B below). In addition to the cholesterol-lowering results from that study reported previously (Hayes et al., *J. Nutr.* 134: 1395-1399; 2004), it has been discovered that the plasma samples from all of the subjects in the study had a beneficially reduced content (averaging 30% decrease) in thiobarbituric reactive substances (TBARS, see Example 11 below) after the subjects had consumed TRP-fortified tortilla chips for four weeks (compared to "control" chips lacking the phyotsterols). These different and compatible functionalities (i.e., beneficial lowering of LDL cholesterol and TBARS levels, and oxidative stabilization of fats) support the novel combination of phytosterols and fish oil in dietary supplements, and the introduction of phytosterols in the form of TRPs into fat-containing prepared foods, e.g., into frying and baking shortenings that are absorbed into or combined with such prepared foods.

Heat-solubilizing non-esterified phytosterols in fat or oil, followed by cooling and recrystallization, results in formation of triglyceride-recrystallized non-esterified phytosterols (herein termed TRPs). Applicants have found that when ingested, regardless of the crystalline size of these fat-recrystallized phytosterols, TRPs were effective at reducing mammalian plasma cholesterol and peroxide levels. By using cost-effective non-esterified phytosterols, and rendering them bioavailable by thermal recrystallization in fat (i.e., heating and cooling in flying fat, baking shortening, receipe ingredient fat, or any other edible fat or oil), the invention provides an effective alternative to using more costly forms of phytosterols for lowering plasma and liver cholesterol levels. Such more costly phytosterols include microparticulate powders (ultrafine micron-sized phytosterol powders), chemically modified fat-soluble phytosterols, e.g., fatty acid-esterified phytosterols, emulsified phytosterols, and the more perishable water-oil microparticulate suspensions of phytosterols. Underlying this new method for utilizing phytosterols is the discovery that although a chemically unmodified phytosterol (such as beta-sitosterol) is insoluble in water and poorly soluble in fat, it need not be converted to a microparticulate powder to be effective at reducing plasma cholesterol levels in vivo.

In the present invention, Applicants describe the combining of higher concentrations of non-esterified phytosterols (greater than 25% to less than or equal to 75% by weight) with vegetable oil as well as other edible oils and fats such as fish oil and flax oil to form TRP complexes. In contrast to the soft and/or fluid TRPs containing between 2% and 25% by weight phytosterols previously described in U.S. Pat. No. 6,638,547, TRPs with higher concentrations of phytosterols and less fat are semi-solid or solid upon cooling to room temperature. It was anticipated that these solid materials would be difficult or impossible for the mammalian GI tract to digest into bioavailable constituents due to the seemingly resistant physical state of the TRPs, given that phytosterols themselves are essentially undigestable and are largely insoluble in vivo. In other words, based on theoretical considerations it was considered unlikely that the phytosterols in these TRP complexes would be capable of reducing plasma cholesterol levels. Surprisingly however, the more concentrated phytosterols in these semi-solid and solid TRPs were nearly as effective (on the basis of weight content of phytosterols) at reducing plasma cholesterol as phytosterols found in liquid TRPs (the latter containing a substantially lower concentration of phytosterols, e.g., typically 10-15% by weight) combined with a larger proportion of fat (typically 85-90% by weight). The same method was used to form these more concentrated TRPs, except that higher temperatures were required to initially dissolve the higher proportions of phytosterols (typically 100-135 degrees C. rather than 60-90 degrees C.). Subsequent cooling of these heated solutions allowed the mixed crystalline TRPs to be formed. Physical characterization, and the testing of these TRPs in the mammalian system are described below. A number of uses for these TRPs, including their use in dietary supplements as well as in additional processed foods are described herein.

In U.S. Pat. No. 6,638,547, Perlman, et al. describe the improved oxidative stability of fats "stored" as TRP complexes in fat-containing foods, as well as a beneficial reduction in the level of plasma LDL cholesterol. As mentioned above, an additional and unanticipated health benefit was discovered in further analyzing the human plasma samples that had been stored frozen from the same clinical study (see Example 7B below). Applicants tested these plasma samples for the presence of undesirable oxidative molecular species measured by thiobarbituric acid-reactive substances (TBARS). It is generally understood that these oxidative species include oxidized cholesterol, plasma lipids, lipoproteins, proteins and the like. It is further understood that elevated levels of these oxidative species in human plasma may accelerate the onset and progression of a number of diseases including but not limited to atherosclerosis and insulin-independent diabetes. Therefore, it was remarkable and useful to discover that the TBARS levels present in seven out of seven subjects tested who had regularly consumed phytosterol-fortified tortilla chips averaged 30% lower (i.e., better) than the TBARS levels measured in the same subjects both at the beginning of the trial and after these subjects-had consumed "control chips" i.e., similar tortilla chips lacking phytosterols, for the same time duration (i.e., 4 weeks). Without wishing to be bound by theory, since it is known that negligible amounts of non-esterified phytosterols are absorbed into the bloodstream, their effect in decreasing the plasma TBARS levels is probably indirect. Accordingly, it is possible that dietary phytosterols in the GI tract reduce the amount of oxidized cholesterol that is absorbed into the bloodstream, and thereby improve the plasma TBARS status.

Accordingly, in a first aspect, this invention provides a product. In certain embodiments, the product is useful for ingestion by mammals, e.g., by humans. The products of the invention have utility in a variety of uses, including without limitation as a component of a prepared food or a dietary supplement, or as a direct food additive. In certain embodiments, the product includes an oxidation-resistant fat-based composition substantially free of exogenous solubilizing and dispersing agents for phytosterols. The fat-based composition of the invention includes between greater than 25% and less than 75% by weight of one or more triglyceride-based edible oil or fat, and greater than 25% and less than 75% by weight of one or more non-esterified triglyceride-recrystallized phytosterols (TRPs). At room temperature a limited amount of phytosterol will solubilize, typically such that a fat will include approximately 1.5% by weight of the phytosterols in solution, with any remaining phytosterols remaining insoluble. Thus, if phytosterols are added to the triglycercide-based edible oil or fat to a level from greater than 25% to 75% by weight at room temperature, the fat-based composition will contain approximately 1.5% solubilized phytosterol and between greater than 23.5% and less than 73.5% by weight of the insoluble phytosterols. Advantageously, because typically the fat-based composition has been partially oxidized by an interval of exposure to air during the manufacture and storage of the prepared food product, in certain embodiments the product contains a reduced amount of oxidative by-products compared to an otherwise similar fat-based composition lacking the non-esterified phytosterols of the invention. In this context, an "otherwise similar fat-based composition" comprises the same percentage by weight of one or more triglyceride-based edible oil or fat but lack the non-esterified phytosterols of the invention.

In particular embodiments, the invention provides product, the fat-based composition of which comprises phytosterols at a level of greater than 25% to less than or equal to 30%, 30-35%, 35-40%, 40-45%, 45-50%, 50-55%, 55-60%, 60-65%, 65-70%, and 70-75%.

In particular embodiments, the invention provides a product wherein the triglyceride-based edible oil or fat contained therein is vegetable oil, vegetable fat, animal oil, animal fat, or mixtures thereof. In some embodiments, the triglyceride-based edible oil or fat is safflower oil, sunflower oil, corn oil, cottonseed oil, soybean oil, canola oil, peanut oil, coconut oil, cocoa butter, palm oil, palm olein, palm super-olein, palm kernel oil, algae oil, flaxseed oil, or combinations thereof.

In further embodiments, the triglyceride-based edible oil or fat is butter, anhydrous milk fat, tallow, lard, mutton fat, poultry fat, fish oil, and combinations thereof. In yet further embodiments, the triglyceride-based edible oil or fat is cholesterol-free or cholester-reduced.

In yet further embodiments, the triglyceride-based edible oil or fat is selected from the group consisting of natural vegetable and animal fats, structurally rearranged or otherwise modified vegetable and animals fats, and combinations thereof.

In yet further embodiments, the non-esterified phytosterol provided by the invention is selected from the group consisting of vegetable oil-derived phytosterols, tall oil-derived phytosterols, and combinations thereof.

In yet further embodiments, the non-esterified phytosterol of the product provided by the invention is selected from the group consisting of beta-sitosterol, beta-sitostanol, campesterol, campestanol, stagmasterol, stigmastanol, brassicasterol, brassicastanol, clionasterol, clionastonal, and combinations thereof.

Storage stability may also be referred to as the shelf-life of product at ambient temperatures. Depending upon the food packaging materials and inert gases utilized in the packaging process, the shelf life for products of the invention may range from about one week to about one year or more. Preferably the shelf-life of a prepared food product containing TRPs is increased at least 5%, 10%, 20%, 30%, 50%, 100%, or even more compared to an otherwise equivalent food product not containing TRPs.

In particular embodiments, the fat-based composition of the invention is heated to a temperature at or above 60° C., for example 60° C. to 80° C., 80° C. to 100° C., 100° C. to 120° C., 120° C. to 150° C., 150° C. to 200° C., or even greater than 200° C.

In a related aspect, a product useful as a prepared food product for ingestion by mammals is provided as above except that the fat-based composition has been partially oxidized by an interval of heating, e.g., frying, baking, cooking and the like, in air, and contains a reduced amount of oxidative by-products compared to a similar fat-based composition lacking said non-esterified phytosterols. An upper limit for the interval of heating in air has not been established. However, it is believed that any duration of heating of a conventional fat (one that is free of phytosterols) that results in an acceptable (not excessive) accumulation of oxidative by-products, (such as free fatty acids and conjugated dienes), will be satisfactory for the phytosterol-fortified fat. For example, fats and vegetable oils may be exposed to temperatures of approximately 180° C. during deep fat frying for periods of time ranging from 5 hr to 25 hr while the prepared food cooked in the oil is exposed to such heat for much shorter intervals, e.g., during cooking (typically several minutes rather than several hours). In any event, a prepared food product as described above may be fried, baked or otherwise heated at least for a time period and to a temperature at least sufficient to dissolve a desired amount (preferably all) of the non-esterified phytosterols added to the fat portion of the fat-based composition. The fat-based composition is substantially free of exogenous phytosterol-solubilizing and dispersing agents. Phytosterol enrichment of the fat-based composition decreases the amount of polar and other oxidative by-products accumulated in the fat and in the prepared food during heating and exposure to air. At least a portion of the non-esterified phytosterols in the fat-based composition are converted by heating, fully dissolving and subsequent cooling, to triglyceride-recrystallized phytosterols, i.e. TRPs, in which the TRPs contained in the fat-based composition and in the prepared food product are bioavailable when ingested, to reduce mammalian plasma cholesterol levels and thiobarbituric reactive substances (TBARS).

In certain embodiments, the amount of the fat-based composition in the prepared food product is between 10% and 75% by weight of the food product, e.g., 10-20%, 20-30%, 30-40%, 40-50%, 50-60%, 60-75% or even higher.

In another aspect, the invention provides a frying fat-based composition which can be held at elevated temperature for a suitable length of time considering the purpose, e.g., at least 0.5 hr, 1 hr, 2 hrs, 4 hrs, 6 hrs, 8 hrs, 10 hrs, or longer. As with any frying fat-based composition, eventually the fat will degrade sufficiently that it will not be used any longer for frying, and may be replaced with fresh fat-based composition. In particular embodiments, the frying fat-based composition oxidizes at a rate that is only 90%, 80%, 70%, 60%, 50%, 40%, 30%, 20% or even less of the rate for the same fat-based composition without phytosterols or other non-fat oxidation rate reducing components.

In preferred embodiments, the invention provides products containing TRPs which are formed by heating at least the fat-based composition (or heating the product as it contains the fat-based composition) to a temperature and for a time sufficient to dissolve the non-esterified phytosterols in the fat-based composition, and subsequently cooling the fat-based composition to room temperature to allow the TRPs to crystallize and be formed. The temperature of the dissolution process may be for example 60° C. to 80° C., 80° C. to 100° C., 100° C. to 150° C., or even greater than 150° C., and the time necessary to achieve dissolution may be for example zero to 1 minute, 1-10 minutes, 10-20 minutes, 20-30 minutes, 30-45 minutes, 45-60 minutes, 1-2 hr, 2-3 hr, 3-4 hr, or longer than 4 hr. As the weight proportion of phytosterols to fat or oil in a mixture is increased, the temperature required to fully dissolve the non-esterified phytosterols, as well as the melting point of the TRP complex produced from that heat-solubilized mixture, increases (see Example 12).

In another related aspect, a prepared food product for ingestion by mammals is provided that includes a plasma cholesterol-reducing oil or fat composition with improved resistance to oxidation. The plasma cholesterol-reducing oil or fat composition is substantially free of exogenous solubilizing and dispersing agents for phytosterols, and includes greater than 25% and less than 75% by weight of one or more triglyceride-based edible oil or fat, and at least greater than 25% and less than 75% by weight of one or more non-esterified triglyceride-recrystallized phytosterols. As described above, typically the phytosterols are soluble in the plasma cholesterol-reducing oil or fat composition at room temperature to a level of approximately 1.5% by weight, so that at least greater than 23.5% by weight of phytosterols are insoluble at room temperature and have been converted by heating, fully dissolving, and cooling to form triglyceride-recrystallized phytosterols, i.e., TRPs. These TRPs, when ingested, are essentially as effective as fat-soluble esterified phytosterols in lowering plasma cholesterol levels in mammals.

In preferred embodiments, the fat-based composition includes at least slightly greater than 25% to less than 75%, for example, 26%, 27%, 28%, 29%, 30%, 35%, 40%, 45%, 50%, 55%, 60%, or less than 75%, by weight of non-esterified phytosterols, or the fat-based composition is in a range defined by taking any two of those values as endpoints of the range. As described above, typically the phytosterols are soluble in the fat or oil at room temperature to a level of approximately 1.5% by weight, and the remainder (e.g., at least 24.5%, 25.5%, 26.5%, 27.5%, 28.5%, 33.5%, 37.5%, 43.5%, 48.5%, 53.5%, 58.5%, or 73.5% respectively) is insoluble at room temperature, but is dissolved and triglyceride-recrystallized by heating to dissolve the phytosterols and cooling. These TRPs, when ingested, are essentially as effective as fat-soluble esterified phytosterols in lowering plasma cholesterol levels in mammals.

In another aspect, the TRPs of the invention are formed by heating at least the above referenced fat-based composition (or a product containing the fat-based composition, or the triglyceride-based edible oil or fat and the non-esterified phytosterols as ingredients of the product) to a temperature and for a time sufficient to fully dissolve the non-esterified phytosterols in the fat-based composition, and subsequently cooling the fat-based composition to room temperature to cause the TRPs to be formed. In further preferred embodiments, the temperature to achieve dissolution is 60° C. to 80° C., 80° C. to 100° C., 100° C. to 150° C., or even greater than 150° C., and the time necessary to achieve dissolution may be for example zero to 1 minute, 1-10 minutes, 10-20 minutes, 20-30 minutes, 30-45 minutes, 45-60 minutes, 1-2 hr, 2-3 hr, 3-4 hr, or longer than 4 hr. At a temperature of 60° C. or below, the rate of dissolution is slower than desirable, and the concentration of dissolved phytosterols in a fat-based composition is lower than generally desired to be commercially useful or practical as known to one skilled in the art.

In another preferred embodiment, the invention provides a method for preparing a TRP-containing fat-based composition, which method comprises: i) heating a mixture comprising one or more triglyceride-based edible oil or fat and non-esterified phytosterols, wherein the mixture comprises less than 75% by weight of triglyceride-based edible fat or oil, and greater than 25% and less than 75% by weight of non-esterified phytosterols for sufficient time and temperature to dissolve said non-esterified phytosterols; and ii) cooling said triglyceride-recrystallized phytosterol-containing fat-based composition to room temperature. The heating step i) above employs a temperature in the range of 40° C. to 150° C., for example, 40° C., 50° C., 60° C., 70° C., 80° C., 90° C., 100° C., 110° C., 120° C., or even 150° C., and the time necessary to achieve dissolution may be for example zero to 1 minute, 1-10 minutes, 10-20 minutes, 20-30 minutes, 30-45 minutes, 45-60 minutes, 1-2 hr, 2-3 hr, 3-4 hr, or longer than 4 hr.

In certain embodiments, the invention provides products useful as prepared foods or useful in the manufacture of prepared foods including margarines, spreads, butter, frying and baking shortenings, mayonnaise, salad dressings, dairy products, nut, seed and kernel butters, or chocolate. In each of these examples, the phytosterols are dissolved by heating them in the fat portion of these prepared foods, i.e., heating without a substantial amount, e.g., less than 10% by weight of the food, of aqueous components present.

In preferred embodiments, the product of the invention is a leavened bakery product comprising a flour, potato chips, French fries, corn chips, tortilla chips, popcorn, crackers, condiments, and sauces. The term leavened denotes being made light by aerating, as with yeast or baking powder.

In yet further embodiments, the invention provides a leavened bakery product comprising a flour which is a cake, muffin, donut, pastry, bread or roll.

In further embodiments, the product of the invention is a condiment which is tomato catsup, mustard, barbecue sauce, steak sauce, Worchestershire sauce, cocktail sauce, tartar sauce, and pickle relish.

In further embodiments, the product of the invention is a sauce which is a tomato-based pasta sauce, pizza sauce, prepared chili, or a dessert sauce.

In certain embodiments, the invention provides a product which is a prepared food product which is fried, baked, or otherwise heat-processed with the fat-based phytosterol-containing composition, and/or where the triglyceride-based edible oil or fat and non-esterified phytosterols are added as ingredients in the preparation of the prepared food, wherein such heating allows a portion of non-esterified phytosterols that is insoluble in the triglyercide-based edible oil or fat at room temperature to be solubilized and thereby enter and be incorporated into the prepared food product, whereupon during cooling, TRPs are formed in the prepared food product.

In further preferred embodiments, the product of the invention is a food product which is cooked, baked, or otherwise heat-processed with the above-described oil or fat plus phytosterol-containing composition, allowing a portion of non-esterified phytosterols that is insoluble in the composition at room temperature to be solubilized. During subsequent cooling to room temperature and crystallization of non-esterified phytosterols, a partial or complete solidification of the oil or fat composition can occur. This solidification decreases the oiliness, particularly the surface oiliness, perceived by hand contact with the food product compared to the same food product prepared without non-esterified phytosterols (due to the formation of TRPs in the fat or oil). Solidification or "hardening" of oil can also reduce or prevent oil separation in certain prepared foods, and is particularly useful in such foods as peanut butter, soybean butter, sesame seed butter and other seed, bean and nut kernel butters. "Hardening" of an edible oil may be compared to that resulting from partial hydrogenation of vegetable oils. Both modifications tend to solidify a vegetable oil by increasing the oil's melting temperature. However, from a nutritional perspective, addition of phytosterols to ones diet advantageously decreases the level of plasma LDL cholesterol and TBARS, while addition of partially hydrogenated oils disadvantageously increases the LDL level.

In a further embodiment, the invention provides a method for producing a fried snack food having reduced surface oiliness, said method comprising frying the snack food in a fat-based composition which comprises one or more triglyceride-based edible oil or fat, and greater than 25% and less than 75% by weight of one or more non-esterified phytosterols.

In certain aspects, the invention provides a product useful as a dietary supplement comprising a fat-based composition wherein one or more triglyceride-based edible oil or fat comprises omega-3 fatty acids at a concentration of at least 10%, for example, 10%-15%, 15%-20%, 20%-30%, and greater than 30%. In certain embodiments of this aspect, the omega-3 fatty acid is DHA, EPA, alpha-linolenic acid, or combinations thereof. In further embodiments of this aspect, the triglyceride-based edible oil or fat is a marine oil. In further embodiments of this aspect, the triglyceride-based edible oil or fat is fish oil, cholesterol-reduced fish oil, cholesterol-free fish oil, algae oil, flaxseed oil, and combinations thereof. In further embodiments of this aspect, the product consists essentially of the triglyceride-based edible oil or fat in combination with phytosterol present as TRPs. In further embodiments of this aspect, the product is packaged in edible capsules, for example edible gelatin capsules.

In preferred embodiments, the food product, and more particularly the fat-based composition within the food product, when heated in air, is more resistant to oxidation and formation of chemically polar degradation products than the same product lacking the non-esterified phytosterols, e.g., as described in Example 3 below. In preferred embodiments, the oxidation rate of the fat-based composition of the invention is at least 20% lower than the corresponding rate for the triglycerisde-based oil or fat of the fat-based composition lacking the non-esterified phytosterol component. In more preferred embodiments, the reduction in oxidation rate of the fat-based composition relative to corresponding composition without non-esterified phytosterols is greater than 20%, for example, 25%, 30%, 35%, 40%, and even 50%.

In further preferred embodiments, the invention provides a method of increasing the oxidative stability of a heated frying fat composition useful for frying, wherein the method comprises maintaining a heated frying fat-based composition which is greater than 25% by weight non-esterified phytosterols at a temperature of at least 100° C., for example, 100° C., 110° C., 120° C., 130° C., 140° C., 150° C., 180° C., and even 200° C.

In preferred embodiments, the product of the invention has a reduced calorie content compared to a similar food product prepared without non-esterified phytosterols, owing to the presence of the non-esterified phytosterols that are calorie-free, and substitute for a portion of triglyceride-based edible oil or fat normally absorbed or otherwise incorporated into the food product. This statement is explained and supported by Example 4 below.

In preferred embodiments, the non-esterified phytosterols are selected from the group consisting of tall oil-derived phytosterols (such as those obtained from the manufacture of wood pulp from pine trees) and vegetable oil-derived phytosterols (such as those derived from soybean oil).

In another aspect, the invention provides an oxidation-resistant frying or baking shortening comprising: i) from greater than 25% to less than 75% by weight of one or more edible triglyceride-based fat or oil; and ii) from greater than 25% to less than 75% by weight TRPs produced from one or more non-esterified phytosterol compound being solubilized by heating and allowed to recrystallize in the fat or oil upon cooling.

Highly preferably the shortening is substantially free of exogenous solubilizing and dispersing agents for phytosterols, and the rate of formation of polar oxidation products upon heating the shortening to a working temperature, for example 160° C. to 200° C., is reduced, compared to the same shortening lacking the at least one non-esterified phytosterol compound. In this context, a working temperature is a temperature at which frying or baking is routinely conducted by one of skill in the cooking or baking arts.

Referring to this aspect, the formation of polar oxidation products was determined by measurement of the dielectric constant of the shortening after two hours of heating as described elsewhere herein (see Example 3, second experiment). The term "reduced," referring to the rate of formation of polar oxidation products, indicates that the increase in dielectric constant of the shortening is reduced at least 5%, and preferably 7, 8, or 10% or more for the phytosterol-supplemented shortening, compared to the non-supplemented shortening.

In preferred embodiments, the oxidation-resistant frying or baking shortening includes one or more edible triglyceride-based fat or oil selected from the group consisting of natural vegetable oils or fats, natural animal fats and oils, structurally rearranged or modified vegetable and/or animal fats (including but not limited to hydrogenated oils), and combinations thereof.

In preferred embodiments, the oxidation-resistant frying or baking shortening includes one or more non-esterified phytosterol compound selected from the group consisting of vegetable oil-derived phytosterols, tall oil-derived phytosterols, and combinations thereof.

In preferred embodiments, the oxidation-resistant frying or baking shortening includes one or more non-esterified phytosterol selected from the group consisting of beta-sitosterol, beta-sitostanol, campesterol, campestanol, stigmasterol, stigmastanol, brassicasterol, brassicastanol, clionasterol and clionastanol, and combinations thereof.

In another aspect, the invention provides a method for reducing plasma cholesterol levels in mammals. The method comprises providing and ingesting a product of the invention, which product comprises a fat-based composition that comprises greater than 25% and less than 75% by weight of one or more triglyceride-based edible fat or oil, and greater than 25% and less than 75% by weight of one or more non-esterified triglyceride-recrystallized phytosterols. The fat-based composition is substantially free of exogenous phytosterol-solubilizing and dispersing agents. The insoluble phytosterols have been heat-solubilized and subsequently cooled to form TRPs. The TRPs when ingested are essentially as effective as fat-soluble esterified phytosterols in reducing plasma cholesterol levels.

In certain embodiments of this aspect of the invention, the proportion of non-esterified phytosterols used in the fat-based composition for a prepared food is greater than 25% and less than 75% by weight of the composition, and more preferably between 26% and 40% of the composition (or other percentage as described for food products herein). Thus, with the latter range, a serving of food containing 10 g of a fat-based composition, would contain between 2.6 g and 4.0 g of non-esterified phytosterols. This amount is consistent with current recommendations published by the U.S. Food and Drug Administration. Further, a serving of food containing 1.5 g of a fat-based composition would contain between 0.4 and 0.6 g of non-esterified phytosterols.

In preferred embodiments, between 0.4 g and 4.0 g of the non-esterified phytosterols contained in the above prepared food are ingested daily by humans.

In preferred embodiments of this aspect of the invention providing for the reduction in plasma cholesterol levels in mammals, the TRPs are formed by heating at least the fat-based composition to a temperature of at least 60° C., for example, 60° C., 70-C, 80° C., 90° C., 100° C., 110° C., 120° C., or even 150° C., for a period of time sufficient to dissolve the non-esterified phytosterols in the fat, and subsequently cooling the fat-based composition (or the food containing this composition) to room temperature to cause the TRPs to be formed. The time necessary to achieve dissolution may be for example zero to 1 minute, 1-10 minutes, 10-20 minutes, 20-30 minutes, 30-45 minutes, 45-60 minutes, 1-2 hr, 2-3 hr, 3-4 hr, or longer than 4 hr.

In certain embodiments, the fat-based composition contains at least slightly greater than 25%, 26%, 27%, 28%, 29%, 30%, 35%, 40%, 45%, 50%, 55%, 60%, 65%, 70%, or less than 75% by weight of non-esterified phytosterols.

In preferred embodiments, the plasma concentration of carotenoids comprising alpha- and beta-carotene is maintained essentially constant while plasma cholesterol levels are reduced.

In further preferred embodiments, the triglyceride-based edible oil or fat of the method comprises at least 10%, for example 10%, 12%, 14%, 16%, 18%, 20%, 25%, 30%, or even 40% by weight omega-3 fatty acids. In further preferred embodiments, the omega-3 fatty acids comprise DHA or DHA plus EPA wherein the levels of plasma triglycerides and cholesterol are simultaneously reduced.

In another aspect, a method is provided for preparing a non-esterified phytosterol-fortified prepared food. The method comprises: (i) providing an edible fat-based composition that comprises greater than 25% and less than 75% by weight of one or more non-esterified phytosterols and greater than 25% and less than 75% by weight of one or more triglyceride-based edible fat or oil, wherein the composition is substantially free of exogenous phytosterol-solubilizing and dispersing agents, and one or more other ingredients for the prepared food if any such additional ingredients are used as known by those of skill in the art; (ii) cooking or otherwise heating the prepared food ingredients with the edible fat-based composition to allow the non-esterified phytosterols to dissolve in the triglyceride-based edible oil or fat and enter or become integrated into the food product; and (iii) cooling the food product to room temperature to allow formation of TRPs in the composition within the prepared food.

In certain embodiments, the fat-based composition can be used as an ingredient mixed with other ingredients in the preparation of the prepared food, and/or the prepared food product can be cooked in the fat-based composition.

While in most cases the non-esterified phytosterols are recrystallized in the oil or fat prior to combining with other ingredients, for some prepared foods, the phytosterols can be combined with the oil or fat in preparation of the prepared food. Thus, alternatively, the fat or oil and the phytosterols can be added as separate ingredients in such manner that the phytosterols will dissolve in the fat or oil upon heating of the combined ingredients. In some cases, only a portion of the phytosterols added as ingredients will become solubilized, e.g., where only a portion of the phytosterols are in contact with the fat or oil during heating. In cases where the fat-based composition, or the oil or fat and the phytosterols are added as ingredients in preparing the prepared food, typically a number of different ingredients are blended or mixed such that the various ingredients are relatively uniformly distributed throughout the mixture.

In the particular embodiments, the fat-based composition containing non-esterified phytosterols is a composition as described for other aspects herein.

In yet another aspect, the invention provides an product useful as a dietary supplement that includes one or more triglyceride-based edible fat or oil, and greater than 25% and less than or equal to 50% by weight of one or more triglyceride recrystallized phytosterols. Such a dietary supplement can also be regarded as a nutraceutical. The supplement can be in numerous different forms, e.g., capsule, pill, wafer. The TRP-fat composition can be combined with other dietary components, such as protein, vitamins, minerals, and combinations of such components.

In certain embodiments, the phytosterol content, fat content, preparation method for the fat-based composition, and other parameters are as described herein for other aspects involving a fat/TRP composition.

In a certain aspect, the invention provides a method for protecting plasma lipoproteins and cholesterol from oxidation in mammals. The method comprises providing and ingesting a product of the invention, which product comprises a fat-based composition that comprises greater than 25% and less than 75% by weight of one or more triglyceride-based edible fat or oil, and greater than 25% and less than 75% by weight of one or more non-esterified triglyceride-recrystallized phytosterols. The fat-based composition is substantially free of exogenous phytosterol-solubilizing and dispersing agents. In preferred embodiments, between 0.4 g and 4.0 g of the non-esterified phytosterols are ingested daily by a mammal, e.g., a human.

In a further embodiment of this aspect of the invention providing protection of plasma lipoproteins and cholesterol from oxidation in mammals, the TRPs are formed by heating at least the fat-based composition to a temperature of at least 60° C., for example, 60° C., 70° C., 80° C., 90° C., 100° C., 110° C., 120° C., or even 150° C., for a period of time sufficient to dissolve the non-esterified phytosterols in the fat, and subsequently cooling the fat-based composition (or the food containing this composition) to room temperature to cause the TRPs to be formed. The time necessary to achieve dissolution may be for example zero to 1 minute, 1-10 minutes, 10-20 minutes, 20-30 minutes, 30-45 minutes, 45-60 minutes, 1-2 hr, 2-3 hr, 3-4 hr, or longer than 4 hr.

In another aspect, the invention provides a food or beverage used in a weight loss regimen for overweight and obese patients wherein the food or beverage comprises non-esterified phytosterols in the form of TRPs wherein the patient can benefit from a reduction in the level of plasma LDL cholesterol. An verweight subject, e.g., a human, can benefit from regular consumption of prepared foods and beverages that include between approximately 400 mg and 800 mg per serving, for example 400 mg, 500 mg, 600 mg, 700 mg, or 800 mg, of non-esterified phytosterols in the form of TRPs that can reduce the level of plasma LDL cholesterol.

In another aspect, the invention provides a prepared food product comprising endogenous cholesterol, and further comprising TRPs that have been added to the prepared food product during or subsequent to its manufacture, wherein the weight ratio of non-esterified phytosterols contained with the TRPs to the endogenous cholesterol is between 2:1 and 10:1, for example, between 3:1 and 7:1, or between 4:1 and 6:1. In preferred embodiments of this aspect of the invention, the prepared food product is a butter-containing spread comprising at least 50% by weight milkfat. In an additional preferred embodiment, the prepared food product is ice cream. In further preferred embodiments, the prepared food product is ground meat or fish-containing product.

The term "prepared" in the context of a "prepared food product" or "prepared food" refers to a commercially processed and packaged food or beverage product containing multiple combined ingredients, in which the processing includes at least one step in which the assembled food product (or one or more triglyceride-based edible fat or oil ingredients that are either contacting, or being combined into the food product), are heated together with a suitable quantity of phytosterol ingredient(s), to a temperature sufficient to dissolve the phytosterols in the triglyceride-based edible fat or oil, and often substantially higher than this temperature, and for a period of time sufficient to process, cook, fry or otherwise complete the heat-preparation of the food product. Upon cooling, a portion of the phytosterols recrystallize in a fat or oil component of the processed prepared food product. Examples of such prepared food products that can retain the TRPs include potato chips, tortilla chips, corn chips and French fries (all fried in oils fortified with phytosterols), popcorn, crackers, pastry, cakes, breads, rolls, muffins, peanut butter, soybean butter, sesame seed butter and other nut kernel butters, margarine, frying and baking shortenings, mayonnaise, salad dressing, chocolate and chocolate-containing products, condiments such as tomato catsup, mustard, barbecue sauce, steak sauce, Worcestershire sauce, cocktail sauce, tartar sauce, and pickle relish, and food sauces such as tomato-based pasta and pizza sauces, prepared chili (meat or meatless) dessert sauces, prepared dairy products such as processed cheeses, yogurt, filled milks, butter, cream and the like.

The term "fat" may be used broadly and generally, referring to an edible triglyceride that may be either liquid (also specifically termed oil) or solid at room temperature (also specifically termed fat) that is derived from a vegetable source (e.g., soybean, cottonseed, corn, palm, algae), an animal source (beef tallow, pork lard, sheep or mutton fat, poultry fat, e.g., chicken and turkey, and fish oil), or a blended combination of sources. Unless specifically limited to fat-based compositions that are solid at room temperature, use of the term "fat" includes oils. Furthermore, unless clearly indicated to the contrary, the term "fat" also includes synthetic fats and oils, chemically and enzymatically modified triglyceride-based liquid and solid fats and blends thereof (e.g., hydrogenated, partially hydrogenated, chemically or enzymatically interesterified, or assembled, i.e., "structured" triglycerides and combinations thereof. For example, structured triglycerides that are known in the art as short chain and medium chain triglycerides, owing to a decreased number of carbon atoms forming the fatty acid chains in the triglyceride molecules, are also included under the broad term "fats." Saturated, monounsaturated and polyunsaturated fatty acids, that in ester linkage with the glycerol molecule make up triglyceride molecules, are well known in the art. Of particular relevance herein, polyunsaturated fatty acids (containing at least two carbon-carbon double bonds) are "essential" dietary nutrients because the human body does not synthesize them. Polyunsaturated fatty acids include omega-6 and omega-3 fatty acids.

The "omega-3 fatty acids" as described above and herein, contain three or more carbon-carbon double bonds with a first carbon-carbon double bond between the 3rd and 4th carbon atoms counting from the omega end, i.e., the free end, of the molecule. Without being bound by theory, the omega-3 fatty acids may help to reduce the risk of heart attack by preventing blood from clotting and sticking to the artery walls and reducing the incidence of cardiac arrthymia leading to sudden death. Flax oil with alpha-linoleic acid, algae oil with DHA, and fish oils containing both DHA and EPA, are useful sources for omega-3 fatty acids, and these edible oils are used in dietary supplements described herein.

The term "cholesterol-free" as defined herein refers to a processed food product or a dietary supplement that contains less than 2 mg of cholesterol per standard serving of food, or per recommended dosage of supplement. "Cholesterol-reduced" (or reduced cholesterol) is meant to indicate that the food product or dietary supplement product contains 50 percent (or less) of the cholesterol found in the product containing the same amount of fat that is not treated or altered to remove cholesterol. Low in cholesterol means that the cholesterol per serving (or per 100 grams of food) is 20 milligrams or less. While the terms "cholesterol-free" and "cholesterol-reduced" as defined by the FDA also typically require that the saturated fat content per serving is 2 grams or less, this limitation does not apply herein.

The phrase "improved resistance to oxidation" for a fat that contains non-esterified phytosterols refers to a fat exhibiting at least a 10% reduced rate of degradation by oxidation in air, compared to oxidation of the same fat at the same temperature without phytosterols. This differential oxidation rate is particularly evident during heating of the oil, e.g., frying with the oil at a temperature of 160-190° C. Oxidation rate is evidenced by one or more physical measurements such as dielectric constant measurement of polar oxidation products formed in the fat, AOM (accelerated oxidation measurement), OSI (oxidative stability index), or organoleptic quality (tasting for rancidity). The extent of oxidative protection provided by non-esterified phytosterols dissolved in fat heated to, for example, 110° C. during stability measurements or 180° C. during frying, is a function of the type of fat and the concentration of phytosterols in the fat. Improved resistance to oxidation is particularly evident in a vegetable oil containing polyunsaturated fatty acids, e.g., soybean, corn and canola oil. When 10% by weight soybean-derived phytosterols is dissolved in such oils, the rate of oxidation, i.e., formation of polar oxidation products, in the heated oils is at least 10% lower than the rate in the same oil lacking phytosterols. Preferably, the rate of oxidation is at least 20% lower, and more preferably, the rate is 30%, 40% or even 50% lower than the rate in the same oil lacking phytosterols. Typically, the rate of oil oxidation decreases as the concentration of phytosterols combined with a fat is increased.

The term "partially oxidized" refers to a fat-based composition that has been exposed to air either with or without heating, e.g., frying or baking and that has at least begun to accumulate oxidative by-products whose concentrations are measurable either in the oil or in the vapor above the oil by conventional means, e.g., by conductivity, dielectric constant, and free fatty acid content.

It is believed that oxidative protection of fats and oils provided by phytosterols has not been reported previously (before the priority date of U.S. Provisional application 60/332,434). Similarly, phytosterols were not recognized as antioxidants or as scavengers or quenchers of free-radicals or peroxides and hydroperoxides formed during oxidation of polyunsaturated fatty acid moieties. In searching for a rational explanation for this oxidative protection, Applicants have looked to literature describing various properties of cholesterol. Of course "cholesterol fortification" of a food product would be nutritionally undesirable and, indeed, phytosterol fortification is intended to reduce cholesterol uptake. However, the cholesterol molecule is structurally related to the phytosterols, i.e., addition of an ethyl side group to beta-sitosterol generates cholesterol. U.S. Pat. No. 6,214,534 by Horowitz et al. describes several UV light photodynamic quenchers including vitamins, thiols, cholesterol, and several other compounds that react with, and inactivate both free radicals and reactive forms of oxygen. Since free radicals, peroxides and hydroperoxides are produced during the oxidation of polyunsaturated fatty acid groups in triglycerides, phytosterols dissolved in fat may inactivate these reactive compounds, as with cholesterol described in the photodynamic system of Horowitz et al. While the phytosterols may act in this manner, the present invention is not limited by this explanation.

The term "edible" in the context of a fat-based composition means that said composition is suitable for use in mammalian, e.g., human, foods, dietary supplements and pharmaceutical preparations.

The term "exogenous phytosterol-solubilizing and dispersing agents" refers to agents other than triglycerides in the prior art, that have been added to triglyceride-based edible oils and fats to promote the cholesterol-lowering efficacy of phytosterols (see discussion above in the Background section). A partial list of these agents includes monoglycerides, diglycerides, lecithin, vitamin E, the sorbitans and other surfactants, and fatty acids chemically esterified with phytosterols.

The term "substantially free," referring to any presence of exogenous solubilizing and dispersing agents for phytosterols, means that either zero percent, or in any event, less than 50% (and preferably less than 25%) of the amount of such an agent or agents that would be required in the absence of triglycerides, to achieve solubilization or dispersal of non-esterified phytosterols (at room temperature) that have been added to the referenced composition. Provided that the phytosterols are recrystallized in triglycerides, triglycerides alone are sufficient for phytosterol bioavailability, i.e., effectiveness in plasma cholesterol reduction. Therefore, any addition of such a non-triglyceride solubilizing or dispersing agent to a fat-based composition containing TRPs is considered gratuitous and optional.

The term "phytosterol" refers to any of a group of sterols and stanols found naturally in plants, or partially or fully hydrogenated (converting sterols to stanols) after removal from plants. The commercially available phytosterols employed in the present invention are typically referred to as "free." As defined herein, "free" means that greater than 75% by weight of the phytosterol material employed exists in chemically non-esterified form. These free phytosterols are derived from soft plants, e.g., soybeans, or alternatively from so-called "tall oil" extracted from woody plants, e.g., pine trees. Preparations of plant sterols may include combinations of these different sources, and typically include mixtures of both phytosterols and phytostanols. The definition of phytosterols is intended to include any and all combinations of phytosterols and phytostanols such as beta-sitosterol and beta-sitostanol, campesterol and campestanol, stigmasterol and stigmastanol, brassicasterol and brassicastanol, and clionasterol and clionastanol. The term also includes non-esterified phytosterols that have been partially or fully converted to non-esterified stanols, typically by chemical hydrogenation.

The term "non-esterified phytosterols" refers to forms of phytosterols that are free of ester chemical side chains. Conversely, esterified phytosterols are most commonly fatty acid-esterified phytosterols manufactured to promote phytosterol solubility in fat. Non-esterified phytosterols are defined herein to include both the non-esterified sterol and stanol forms of phytosterols (see Example 1 below). According to the present invention, phytosterols are dissolved in oil or fat before recrystallization, and therefore the particle size, texture, etc. of the material can be coarse for reasons of economy, i.e., chemical dissolution reduces the material to molecular dimensions. Dissolution of more costly forms of phytosterols, e.g., ultrafine micron-sized phytosterol powders, would be economically wasteful, but can also be done.

The process of treating the non-esterified phytosterols by "heating, fully dissolving, and cooling" refers to a process that: (i) heats the phytosterols together with triglyceride-based edible fat or oil (and optionally other food ingredients constituting a prepared food product) to a temperature of greater than 60° C. until the phytosterols have dissolved, and then (ii) cooling the heated product and allowing the triglycerides to associate with the recrystallizing phytosterols. Flash-chilling with chilled air or with a chilled water jacket may tend to precipitate and segregate the phytosterols from the triglycerides, preventing optimal recrystallization. Conventional or normal ambient air cooling rates of prepared foods containing heated triglycerides and phytosterols is preferable to flash cooling. For example, in many cases cooling of a fat-based composition or prepared food to room temperature will occur over a period of 5 minutes to 2 hrs, although longer or shorter times can be used.

The term "triglyceride-recrystallized phytosterols" or TRPs and the process of heating and cooling these ingredients is described elsewhere herein. The term "recrystallized" is distinguished from the term "solubilized" (in which the phytosterols are dissolved to form a clear solution). Recrystallized is meant to indicate that the phytosterols after initially being dissolved in one or more triglyceride-based edible fats or oils, are allowed to cool and recrystallize in the oil or fat. By physical analyses (light microscopy of lipid stained crystals, and melting temperature determinations described elsewhere herein), Applicants have determined that such recrystallization results in fats and/or oils, i.e., triglycerides, becoming intimately associated with crystallizing phytosterols. The resulting products are mixed and/or interrupted crystal structures having melting temperatures reduced below that of the phytosterols alone. It is believed that these physically destabilized, triglyceride-containing crystals are more easily emulsified and/or dissolved in the mammalian gut, resulting in improved phytosterol bioavailability and therefore more effective plasma cholesterol reduction in vivo. As noted above, a proportion of the phytosterols is soluble in the fat at room temperature (typically at a concentration of about 1.5%). Therefore, when a combination of phytosterols and fat is heated to dissolve the solid (e.g., crystalline) phystosterols, and the solution is then cooled, the phytosterols that cannot remain in solution at room temperature solidify or recrystallize, and a portion remains dissolved in the fat. Unless clearly indicated to the contrary, reference herein to "triglyceride-recrystallized phytosterols" or "TRPs" and the content thereof, includes all the phytosterol content in a composition but not its fat content, i.e., both the dissolved phytosterols as well as the re-solidified or recrystallized phytosterols. Thus, the weight proportion of TRPs in a composition produced only from fat and phytosterols is simply calculated based upon the weight of phytosterols relative to the weight of fat plus phytosterols. As an example, if 25 g of non-esterified phytosterols (including any non-esterified phytostanols) is dissolved and recrystallized with 75 g fat, the composition is said to contain 25% by weight TRPs.

The term "effective" refers to the extent to which plasma cholesterol levels in mammals are reduced by regular, e.g., daily, twice daily, or thrice daily ingestion of the recommended 1-2 gram dose (or the appropriate divided dose) of phytosterols. In a random population of human adults, a 5% to 15% or greater lowering of total cholesterol in the plasma caused by ingestion of phytosterols is considered-effective.

The term "esterified phytosterols" refers to phytosterols (plant sterols and stanols) that have been joined through an ester linkage to fatty acids using a chemical, enzymatic, combination, or other process. The commercial margarines Benecol® and Take Control® discussed above, incorporate such esterified phytosterols. Therefore, "non-esterified phytosterols" refers to phytosterols that have not been esterified to fatty acids as described.

The term "reduced surface oiliness" means that upon routine handling of the prepared food, less oil is transferred from the food to ones hands (or to an absorbant surface) than would otherwise occur if the food were prepared with the oil or fat alone (see Example 5 below).

As used herein, the term "dietary supplement" has a specific legal meaning in the U.S. established by the Dietary Supplement Health and Education Act (DSHEA). It refers to a product that supplements the diet and whose label clearly states that it is a dietary supplement (sometimes commonly referred to a nutritional supplement). A dietary supplement is distinct from a drug which is represented as a substance that is intended to diagnose, cure, mitigate, treat, or prevent diseases and which must undergo extensive testing and be pre-approved by the FDA before being sold. There are specific cases where dietary supplements may also be labeled as impacting disease. Dietary supplements typically contain the following kinds of ingredients: vitamins, minerals, herbs, botanicals, other plant-derived substances, amino acids (the individual building blocks of protein) and concentrates, metabolites, constituents, and extracts of these substances. They are intended for ingestion typically in pill, capsule, tablet, or liquid form and are not represented for use as a conventional food or as the sole item of a meal or diet. Dietary supplements are typically adapted to supplement, i.e., add to, an individual's dietary intake of one or more dietary components, for example, fish oil supplements providing omega-3 fatty acids. Non-esterified phytosterols refined from vegetable sources can be combined with edible vegetable or animal oils or fats to form TRPs. These may be packaged in gelatin capsules to provide a convenient dietary supplement. In general, gelatin capsule formulations comprise raw gelatin, plasticizer, solvent and optional ingredients such as flavors and colorants, as known by those skilled in the art. If the phytosterols are combined with edible fish oil also forming TRPs, this combination can provide a supplement with the health benefits of both omega-3 fatty acids as well as phytosterols. Both the fish oil and the phytosterol in the form of TRPs are biochemically accessible, i.e., bioavailable, in the mammalian gastrointestinal tract (see Examples 15 and 16). A "neutraceutical" refers to a product isolated or purified from raw or unprocessed food materials, and generally sold in medicinal forms not usually associated with food. By definition, neutraceuticals provide a physiological benefit or provide protection against chronic disease. In the present invention, phytosterols provide a hypocholesterolemic benefit and are a nutraceutical. Phytosterols can be purified from raw vegetable oils such as soybean oil and incorporated into dietary supplements and processed food products.

The term "condiment" as used herein means a savory, pungent, piquant, spicy, acidic or salty accompaniment to food to enhance flavor or give added flavor, such as a relish, sauce, mixture of spices and so on. Catsup and mustard are two of the most popular condiments in the U.S.

The term "sauce" as used herein means a fluid, semifluid or sometimes semisolid accompaniment of solid food, such as a meat stock, fish stock, milk or cream that has been thickened and flavored with spices, condiments, and the like (e.g., bechamel, brown sauce, hollandaise, veloute). Some sauces are sweetened mixtures served as toppings on desserts. Other sauces include stewed or canned fruit eaten as an accompaniment with other food. Many condiments are considered sauces, and vice-versa, e.g., steak sauce, hoisin sauce, Worcestershire sauce, hot pepper sauce, and the like.

For the definition of any fat and oil-related terms that have not been expressly defined herein, the reader is referred to the reference book, *Bailey's Industrial Oil and Fat Products*, Fourth Edition, Daniel Swem, editor, John Wiley & Sons, N.Y., 1979.

By "comprising" is meant including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

Additional aspects and embodiments will be apparent from the following Detailed Description and from the claims.

DETAILED DESCRIPTION OF THE PREFERRED EMBODIMENTS

Recently, a number of investigators have described a variety of methods for producing very small particles or microcrystals of phytosterols. It is believed that such small particles have greater efficacy in being dispersed in the GI tract and controlling plasma cholesterol levels. U.S. Pat. No. 6,129,944 by Tiainen et al. describes the production of a microcrystalline phytosterol product useful as a cholesterol-lowering agent, formed by pulverizing, i.e., dry or wet grinding, a crystalline phytosterol to produce microparticles having a preferred mean particle size of approximately 5-10 microns. The microcrystalline phytosterol product can be mixed with a sweetening agent and water or alternatively, mixed with another carrier such as fat to form a microparticulate emulsion. There is no suggestion by Tiainen et al. or any other investigator of which the inventors are aware that microcrystalline phytosterols after being formed, should be heated or dissolved in such a fat or oil. Such heating in oil, as described for the present invention, would be expected to destroy the sized microparticles described by Tiainen et al.

As described herein, phytosterols are recrystallized with triglycerides (e.g., vegetable oil, shortening, or the like). The first step involves heating the triglyceride(s) and phytosterol(s) until the phytosterols are dissolved. This phytosterol-triglyceride solution is used to contact, or be combined with the food product being fried, cooked or otherwise heated. (Alternatively, the fats and the phytosterols are added as separate ingredients in the preparation of a prepared food.) Subsequently, the prepared food product is cooled (preferably by contacting the heated food product with ambient air). Under the light microscope (600× magnification), it is seen that phytosterols that have been recrystallized in vegetable oil, e.g., soybean oil, tend to form a diversity of macrocrystalline structures spanning tens or hundreds of microns. This material when tasted, has a surprisingly soft and agreeable mouth feel, and includes elongated hexagonal crystals, radially extending branched crystalline needle structures (appearing as wispy ball-shaped structures), and large extended flat plate crystals. On the other hand, phytosterols that are recrystallized by quick-chilling to room temperature (e.g., by ice chilling to room temperature in a few seconds rather than by ambient air contact), tend to form harder, smaller, more homogeneous needle-like micro-crystals having diameters of only a few microns, i.e., 1-4 microns.

The temperature required to re-dissolve the above crystals in the surrounding vegetable oil differs significantly depending upon the rapidity of recrystallization. For example, 10% by weight soybean-derived phytosterols that were recrystallized at room temperature in soybean oil, redissolved in the oil at a temperature of 65° C. On the other hand, the more rapidly ice-recrystallized phytosterols described above required a higher temperature (72° C.) to be redissolved. By comparison, the same amount of phytosterol (as a dry powder) initially placed in soybean oil, required a temperature of nearly 85° C. to be dissolved. The observations on recrystallization (coupled with the microscopic analysis of crystalline sizes and shapes) suggested that slower recrystallization allows formation of mixed composition triglyceride-containing (larger) phytosterol crystals. These crystals would be expected to redissolve more easily, i.e., at a lower temperature, than the rapidly formed crystals.

To determine whether the larger crystals contained any triglycerides, these crystals were washed and centrifuged twice in ethanol. Next, the crystals were stained with a saturated Sudan Black solution (60% by weight ethanol in water) to visualize any lipids. Light microscopy confirmed that the lower melting point larger crystals (but not the higher melting point small needle-shaped crystals) contained multiple internal layers and occlusions of lipid. It is reasonable to conclude that the intimate association of triglycerides and phytosterols that results from fully dissolving and then recrystallizing phytosterols in fats, yields crystals having a reduced melting temperature. These crystals appear to provide dietary phytosterols in a highly bioavailable form useful for reducing plasma cholesterol levels.

While it has been recently reported that a crystalline complex can be formed by combining phytosterols and monoglyceride emulsifiers (see above, U.S. Pat. No. 6,267, 963), the existence and utility of triglyceride-recrystallized phytosterols have not been previously described. In fact, Applicants have not found any prior reference to formation of a mixed crystalline complex or association between triglycerides and phytosterols that enhances phytosterol bioavailability.

Non-esterified phytosterols are known to have a very limited solubility (to a concentration of approximately 1.5% by weight) in an edible oil or fat at room temperature. Nevertheless, between 1.5% and 75% by weight of non-esterified phytosterols (e.g., semi-pure or purified phytosterols from soybeans or pine tree tall oils), can be readily and conveniently dissolved in edible oil or fat by heating to a temperature of 60° C. or greater, and preferably to 75° C., 100° C., 125° C. or above (the required temperature depending upon the concentration of phytosterols to be dissolved). Subsequently, as the heated composition is cooled to room temperature, a substantial portion of the solubilized phytosterol precipitates, i.e., is recrystallized, in the triglyceride-based edible oil or fat in the form of a Triglyceride-Recrystallized Phytosterol composition or complex (abbreviated "TRP", "TRP composition or TRP complex").

Remarkably, the TRP composition formed in this manner has been found to be as potent in the mammalian diet at reducing the levels of plasma and liver cholesterol as fatty acid-esterified phytosterols that are fully soluble at room temperature. In the first direct comparison between non-esterified phytosterols and equivalent amounts of phytosterols as sterol esters in the same experiment, it was found that non-esterified phytosterols fully dissolved in oil by heating (>60° C., preferably >80° C., and more preferably to >100° C.), and then subsequently cooled, provided equivalent (or even greater) reductions in plasma and liver cholesterol as compared to equivalent amounts of esterified sterols. In the context of cholesterol reduction, the term "greater" means that the cholesterol reductions measured and reported herein and in Hayes, et al. (*J. Nutr.* (2004) 134:1395-1399) are greater than those reported by Ntanios and Jones (*Biochim. Biophys. Acta* (1998) 1390:237-244) for the same levels of sterols, in which the sterols were incompletely dissolved in fat. While TRPs may have been accidentally produced in the past in the course of heating and cooling non-esterified phytosterols and fats, their utility for plasma cholesterol reduction would not have been recognized due to their poor room temperature solubility.

The presently described TRP composition is more convenient and cost-effective than esterified phytosterols or phytosterol-containing compositions that have been supplemented with solubilizers, emulsifiers, antioxidants and other additives for inclusion in foods. The TRP composition also has a significant advantage over the finely milled and microcrystalline powdered forms of phytosterols described by Tiainen et al. and Jones et al., in light of the considerable cost associated with producing these micron-sized powders. The present composition is particularly useful in preparing fat-based foods such as shortening, margarine, mayonnaise, salad dressing, peanut butter and the like, and processed food products including fried and baked snack foods.

Surprisingly, as illustrated below, the presence of dissolved phytosterols in a heated oil or fat, improves the triglyceride's oxidative stability, and at ambient temperature, decreases the surface oiliness of foods fried in the triglyceride-based composition. At the same time, the caloric fat content of a food prepared in or with the TRP-containing composition is reduced. While other investigators have found that finely milled or microcrystalline preparations of non-esterified phytosterols that have not been initially heat-solubilized in an oil or fat, can also function efficiently to reduce mammalian plasma cholesterol levels, the additional benefits described above are obtained only after heat-solubilization. For example, heat-solubilization in a triglyceride-based edible oil allows non-esterified phytosterols to freely enter a food product as it is being fried in the oil, whereas particles of phytosterols would be excluded. Likewise, suspended particles would not be expected to improve the oxidative stability of the oil.

For the purpose of this invention, the fat or oil used as a vehicle or carrier for the phytosterol herein, is a conventional triglyceride-based cooking fat or oil that is substantially free of phytosterol solubilizing agents, dispersants and/or detergents (collectively termed "oil emulsifiers or additives"). Examples of such fats and oils include natural vegetable oils, interesterified fats and oils, and partially hydrogenated vegetable oils, animal fats and combinations thereof.

Unlike recently described compositions for oils and fats containing phytosterols described above in the Background, the presently described triglyceride-based composition contains substantial amounts of insoluble phytosterol (recrystallized in fat) rather than solubilized phytosterol, and is substantially free of the above-described oil additives for dispersing or solubilizing phytosterols. The composition is particularly useful in preparing fat-containing foods that do not require oil transparency at ambient temperatures. This is true of margarines, shortenings, mayonnaise, cheese and other dairy fat-containing products, some salad dressings, condiments such as tomato catsup, mustard, barbecue sauce, steak sauce, Worchestershire sauce, cocktail sauce, tartar sauce, and pickle relish, and food sauces such as tomato-based pasta and pizza sauce that may contain olive and other vegetable oils, prepared chili and many other foods including processed foods that are fried, baked or otherwise prepared by cooking or heating in, or in combination with fat or oil. Examples of such foods include the snack food category, e.g., potato chips, crackers, and the bakery category, e.g., donuts, pies, cakes, breads, rolls, muffins, cocoa butter-containing chocolate products and the like.

The present invention describes compositions and methods for introducing substantially fat-insoluble non-esterified phytosterols into dietary supplements such as omega-3 fish oil-containing supplements, and processed food products, including snack foods, by means of the standard fat or oil that is used in the recipes for, or in the frying or baking of such foods. It was the inventors' intention to compare the efficacy of using non-esterified phytosterol preparations recrystallized in edible fat and used in foods, e.g., fried foods, with that of more costly diglyceride-solubilized or fatty acid esterified phytosterols in limiting cholesterol absorption in the gut, and lowering plasma cholesterol levels. Surprisingly, the phytosterols recrystallized in fat that has been incorporated into such foods are very effective, i.e., bioavailable, in reducing plasma and liver cholesterol levels. It is believed that this cholesterol-lowering efficacy compares favorably with that of fully solubilized phytosterol preparations (e.g., phytosterols esterified with fatty acids to assure solubility in fat-containing products such as Benecol® and Take Control® margarines).

As an unanticipated benefit and utility in the present invention, the presence of 5-10% or more by weight of phytosterol that has been recrystallized with triglycerides in the oil portion of fried snack food (e.g., potato chips) has been found to decrease the surface oiliness of fried food when compared to food fried in oil lacking the phytosterol. Applicants have also found that the presence of either soybean oil-derived phytosterols or tall oil-derived phytosterols in vegetable oil during flying, helps in chemically stabilizing the oil against oxidation by reducing the rate of appearance and the amount of polar breakdown products in the oil. To the extent that the phytosterols replace a portion of the oil in such a blend, the phytosterols also serve to reduce the caloric fat content of a food cooked in the blend. Thus, the present invention also provides methods for decreasing the surface oiliness of fried foods, and the resulting fried foods, and methods for providing reduced calorie food, utilizing TRPs as described herein.

Except for micron-sized finely milled powders of non-esterified phytosterols described by Tiainen et al. and Jones et al. (see above), as well as previously described emulsified preparations, the non-esterified phytosterols have been thought to lack "bioavailability" relative to esterified sterols and stanols, as emphasized in the introductory references. In this instance, bioavailability for a given quantity of phytosterol means the potency of that particular physical and/or chemical form of phytosterol in lowering the plasma level of total and LDL cholesterol. Despite the limited solubility of non-esterified phytosterols in fats and oils at room temperature, it has been discovered that concentrations of between 1.5% and 75% by weight non-esterified phytosterols (e.g., soybean oil-derived mixed prilled sterols or stanols or tall oil-derived sterols and stanols) can be conveniently and rapidly dissolved by mixing or other agitation in diverse oils, fats and fat-containing foods, e.g., cooking or salad oil, shortening, peanut butter and dairy cream, heated to a temperature of greater than 60° C., and preferably between 75° C. and 150° C., or above. At higher temperatures such as 180° C., a heated oil or fat, e.g., corn, canola, cottonseed, soybean oil, or palm oil that contains heat-solubilized phytosterols is useful in the preparation (e.g., frying and baking) of potato chips and other snack foods. When such heat-solubilized phytosterols are cooled and recrystallized in such fats or fat-containing foods, their ability to lower plasma cholesterol levels is excellent (see nutritional studies below).

The fat compositions and food products of the present invention can be prepared by conventional methods, with the addition of phytosterols (e.g., as described herein). Persons familiar with preparation of fat compositions and food products can routinely select suitable components for a particular product.

Preliminary Study. Reducing Plasma Cholesterol Using Non-Esterified Phytosterols and an Emulsifier in Dietary Fat.

The efficacy of adding 0.25% by weight soybean oil-derived prilled sterols and 0.25% soybean prilled stanols to a hamster diet containing 0.05% cholesterol to reduce the animal's plasma cholesterol level was investigated. Hamsters were fed a cholesterol-containing diet in which the dietary fat (30% soybean oil, 50% palm oil and 20% canola oil-providing approximately equal amounts of saturated, monounsaturated and polyunsaturated fatty acids) was either supplemented or unsupplemented with up to 6% by weight of an emulsifying agent to enhance the solubilization of sterols and stanols in the fat portion of the diet. It was expected that this agent, a mono- and diglyceride emulsifier (40% glyceryl monooleate+60% glyceryl dioleate), which readily dissolves both sterols and stanols, would enhance the ability of these phytosterols to lower hamster plasma cholesterol levels.

Surprisingly, each cholesterol-lowering regimen (i.e., sterols and stanols, each tested separately after heating with dietary fat; or stanols combined with either 3% or 6% by weight of the above emulsifier in the heated dietary fat) was found to reduce the plasma cholesterol level to the same extent. More specifically, while the plasma total cholesterol value (TC) in hamsters fed a cholesterol-supplemented diet was found to average 185 mg/dL, and the TC value in hamsters fed a cholesterol-free diet averaged 135 mg/dL, all of the dietary regimens incorporating a low level (0.25% by weight) of phytosterols (5:1 sterol-to-cholesterol) resulted in significantly reduced TC values averaging 160±15 mg/dL. (liver EC, i.e., esterified cholesterol, showed that 1:3 monoglycerides improved efficacy, as well) These results suggested that phytosterols can function effectively to lower TC both when they are solublized in the diet (e.g., using mono- and diglycerides added to a dietary fat) and when they are recrystallized in the triglyceride (fat) portion of the diet, after being initially solubilized in the heated fat. It is also possible that finely milled micron-sized powder phytosterol preparations would function well to lower TC (without fat recrystallization), but these preparations have the disadvantage of greater manufacturing cost.

EXAMPLES

Example 1

Phytosterol Preparations and Solubilities in Cooking Oil

Two industrial samples of non-esterified phytosterols were used in a series of experiments described below. These samples included soybean oil-derived mixed prilled phytosterols and mixed prilled stanols (the latter prepared by fully hydrogenating the former). Both were obtained from ACH Food and Nutrition, Inc., Memphis, Tenn. The soybean oil-derived prilled phytosterols containing up to 4% by weight brassicasterol, 30% campasterol, 20% stigmasterol, and 40% beta-sitosterol.

The limit solubility of each phytosterol in cooking oil was measured by fully dissolving a graded series of concentrations (from 1% to 5% by weight, in steps of 0.5%) of each sample in soybean oil heated to 150° C., then cooling the samples to room temperature and waiting 24 hours for any supersaturating phytosterol to crystallize. All phytosterols appeared soluble in room temperature cooking oil at a concentration of 1.5% by weight, while all showed precipitates at concentrations of 2.0% and higher.

It is generally appreciated that at least 1-1.5 grams per day of phytosterol must be consumed by humans to achieve a useful decrease, e.g., a 5%-15% decrease, in the plasma cholesterol level. If one is to obtain this phytosterol dose in, for example, two 1 ounce servings of a food product rich in fat, e.g., a snack food containing 30% by weight fat, then the fat should contain approximately 7% by weight (or more) phytosterols (7% phytosterol×30% fat×56 g food=1.2 g phytosterol). With a limit solubility of approximately 1.5% in room temperature oil, most of this 7% level of phytosterol crystallizes in a conventional cooking oil or fat as it cools.

In the hamster, rabbit and human nutritional studies by Jones et al. and Ntanios et al. (cited above), non-esterified phytosterols provided in dietary fats caused a significant reduction in plasma cholesterol levels. Whether these phytosterols were simply suspended in the dietary fat as indicated in the rabbit and human studies, or alternatively, dissolved as suggested in the hamster study, (and described in the present invention), was investigated. Applicants prepared the coconut-olive-sunflower fat blend specified by Ntanios et al. in their hamster study, mixed it with the specified amount of tall oil-derived phytosterols (1 part by weight phytosterol and 5 parts by weight of the fat blend), and heated the resulting 17% by weight phytosterol suspension to 60° C., also as specified. After 4 hours heating, the suspension appeared unchanged, i.e., undissolved. It has been concluded that the bulk of phytosterols used by Ntanios et al. were suspended in oil rather than being dissolved and recrystallized.

In fact, Applicants have determined that little more than 2-3% by weight phytosterols can be conveniently dissolved in fat when heated only to 60° C. Temperatures greater than 60° C. are suggested for fully dissolving these higher concentrations of phytosterols in fats and oils, and preferably temperatures of 75° C., 100° C. or even greater to speed the solubilization process prior to allowing recrystallization to occur. Within the scope of the present invention, for much more dilute phytosterol suspensions than those described by Ntanios et al., i.e., for 2%-6% by weight phytosterol suspensions in fats and oils, temperatures as low as 50° C.-60° C. may eventually promote phytosterol solubilization, albeit at a much slower rate than solubilization at 75° C.-100° C., prior to cooling and formation of TRPs.

Example 2

Crystalline Phytosterol Composition Formed with Triglycerides

One part by weight tall oil-derived phytosterol or one part by weight soybean-derived prilled phytosterol powder (non-esterified phytosterols) described above were each heated with nine parts soybean oil. The temperature required to solubilize these 10% by weight powders in oil was approximately 75-85° C. From Example 1 it was estimated that approximately 8.5% by weight phytosterols (out of 10% total) recrystallized in the oil following cooling to room temperature. Phase contrast microscopic examination (600× magnification) of the solids showed a mixture of extended needle and plate-type crystalline material suspended throughout the mixture, that differed markedly from the amorphous solids originally placed in the triglyceride oil.

Upon reheating, much of the precipitated crystalline material appeared to redissolve very quickly at a temperature 10-20° C. below the original solubilization temperature for the phytosterol powders. Thus, phytosterols first heated and dissolved, and then recrystallized in triglyceride oils appear to be more readily heat-dispersible than purified phytosterol powders. This observation supports the hypothesis that a crystalline phytosterol composition is formed in (or together with) triglycerides, that may be more bioavailable and effective in the mammalian gastrointestinal system than phytosterol alone for reducing cholesterol absorption.

The limited bioavailability of non-solubilized phytosterol powder is evident in the earlier research of Faquhar et al., Kucchodkar et al., and Lees et al. (cited above in the Background). Their research indicated that nine or more grams of phytosterol powder in the human diet were required to achieve a significant decrease in plasma cholesterol. However, using fat-solubilized esterified phytosterols (e.g., the phytosterols in Benecol® margarine), it is now generally appreciated that only 1.5-2 g of such esterified phytosterols are required to achieve a similar cholesterol-lowering effect. This difference in potency between substantially insoluble non-esterified phytosterol and soluble phytosterol esters can be eliminated by heating and fully dissolving phytosterols, and then cooling and recrystallizing the phytosterol in the triglyceride-based medium.

Example 3

Antioxidant Effect and Chemical Stabilization of Cooking Oil Containing Phytosterols Applicants wished to determine whether admixing and dissolving a substantial concentration of phytosterol (e.g., 10% by weight) in a heated cooking oil, would alter the chemical properties or physical cooking properties of the cooking oil. For example, would the presence of phytosterol accelerate the rate of oxidation or rancidity development in the oil, would the oil retain its original flavor, and would the cooking time for a particular food at a specified temperature be appreciably altered? Additionally it was of interest to compare the extent of oil uptake by a food fried in vegetable oil with and without the phytosterol.

Accordingly, 10% by weight of the above-described soybean oil-derived phytosterols were dissolved in a one pound quantity of heated canola oil, and approximately 20 successive small batches of potato chips (russet potatoes, approximately 20 slices, 3-4 g per slice) were fried in each of these oils at 170° C. (338° F.) until a ratio of one pound of finished chips (1.0-1.2 g per chip) had been processed through each pound of oil. An identical quantity of potato chips was fried in plain canola oil as a "control". The similarly heated spent cooking oils and the finished potato chips were evaluated as follows: The extent of canola oil oxidation in each oil sample was measured using an instrument known as a "Foodoil Sensor" (Northern Instruments Corporation, Beachwood, Ohio) that measures the dielectric constant of the oil. This measurement is a direct indicator of the relative content of peroxides, acids, and other polar compounds formed in the oil as it is being degraded. Following "zero-baseline" calibration of the instrument for each unheated cooking oil formulation, the following average dielectric readings were obtained (based upon triplicate measurements) for the potato chip-cooked residual oils.

| | |
|---|---|
| Plain Canola Oil | 1.03 ± 0.10 |
| Canola Oil + 10% soybean phytosterol | 0.79 ± 0.15 |

These readings indicate that contrary to accelerating any oxidation of the canola oil during heating, the presence of phytosterols (10% by weight) significantly stabilized the oil against oxidation, reducing the amount of polar by-products formed in the canola oil during heating by approximately 23%. The anti-oxidant effect and chemical mechanism that would explain this oil stabilization by phytosterols remains to be determined.

A second experiment was carried out to further characterize the antioxidant effect of phytosterols in heated cooking oils. To determine whether a variety of heated edible fats and oils could be "stabilized", i.e., made more resistant to oxidation in air by adding phytosterols, two different levels of soybean oil-derived phytosterols (5% and 10% by weight, and 0% as a control) were added to three different vegetable oils. Each sample of oil (5 gm) was heated in a 100 ml capacity Pyrex® glass beaker for two hours at 170° C. (338° F.). Dielectric readings of these oils following heating (using the same Foodoil Sensor described above) are provided in Table 1. As above, the dielectric reading for each sample prior to the two hour heating in air was used as the zero baseline reference for that sample.

A third experiment was carried out to compare the antioxidative potency of both non-esterified sterols and stanols in heated canola oil. The determination was performed under exactly the same conditions as the second experiment above, except that for the purpose of accelerating the oxidation rate, the heated oil temperature was increased from 170° C. to 190° C. (374° F.).

Results. For each edible oil tested in the second experiment, the addition of phytosterols significantly reduced the dielectric constant as an index of the concentration of polar compounds produced, i.e., oxidation products formed, in the oil during heating at a temperature (170° C.) corresponding to that currently used for deep fat frying of foods. Addition of 10% by weight phytosterols to different vegetable oils resulted in approximately a 30-50% decrease in polar compound formation during the two hour incubation (see Table 1a). This decrease was nearly twice as great as the decrease measured for the addition of 5% by weight phytosterols. This suggests that the amount of antioxidant protection provided in edible oils and fats by phytosterols is approximately proportional to the concentration of added phytosterols (at least for that concentration range of phytosterols tested). However, as can be seen from the results of experiment 3 (Table 1b), the effectiveness of non-esterified phytosterols in lowering the rate of oxidation is somewhat reduced by the higher oil temperature. Also, it is important to note that 10% by weight non-esterified stanols when added to canola oil is at least twice as effective in reducing polar compound formation during oil heating, as the same concentration of non-esterified sterols. The chemical explanation for this difference remains unclear.

Before carrying out these experiments, an initial question was whether substantial concentrations of phytosterols (e.g., 5-10% or more) might undesirably act as pro-oxidants during sustained heating of cooking oil. From the series of experiments herein, it is clear that these concentrations of phytosterols act beneficially as mild to moderate antioxidants rather than pro-oxidants.

From these results, it is believed that such phytosterols (sterols, stanols or mixtures thereof) added to edible oils and fats used in prepared food products, will also provide increased shelf-stability for these products, via resistance to oil oxidation and rancidity development at room temperature.

Example 4

Quantitation of Cooking Oil and Phytosterol Absorbed by Potato Chips During Frying Two other potential problems with frying foods in a phytosterol-enriched cooking oil were examined. First, it was considered possible that the amount of fat adsorbed by fried food in a phytosterol-enriched oil might be greater than in regular oil. Accordingly, several tests were conducted using individual potato slices (approximately 4 g each) that had been-pre-blotted on paper towels and deep-fried one at a time at a temperature of 180° C. in different cooking oils. Two cooking oils were used (corn oil and canola oil) either with or without 10% soybean-derived prilled phytosterols being added and dissolved in the respective oils. Regardless of which oil was used, and regardless of whether phytosterols were present or absent, the average weight of the fried, drained potato chips, expressed as a percentage of the original weight of the blotted uncooked potato slices, was constant at 31%±1%.

With regard to physically quantitating the amount of absorbed oil, an analysis of the potato chips fried in corn oil on the one hand, and 90% by weight corn oil plus 10% (heat-solubilized) soybean-derived prilled phytosterols on the other hand, showed that the total weight proportion of oil that was solvent-extractable from the fried chips was constant, regardless of whether soy phytosterols were present or not. More specifically, seven potato chips (fried as described above in each of these two oils) were weighed, ground with anhydrous sodium sulfate, and solvent-extracted three times with chloroform:methanol (2:1 vol/vol). This extraction method removes both phytosterols and fats from the food. The combined oil extracts were dried and weighed, and the weight ratio of extracted oil to potato chips determined. The fat content of the corn oil chips was 29±2% and the content of the phytosterol-containing chips was 30±2%.

Second, there was a concern that the fat being adsorbed by a fried food such as potato chips, might be either enriched or alternatively depleted of phytosterols, compared to the proportion of phytosterols dissolved in the original heated cooking oil. In fact, chemical analysis of the 29% by weight cooking oil that had been extracted from the above potato chips (fried in 90% by weight canola oil plus 10% by weight soy oil-derived phytosterols, see above) showed that the extracted oil composition was the same as the frying oil composition (90% oil:10% phytosterol).

Phytosterol analysis employed the following method: Oil plus phytosterol contained in potato chips was first extracted into chloroform. A portion of the chloroform (100 μl) was evaporated, redissolved in a small quantity of isopropyl alcohol (20 μl), and then assayed using Test Kit #352 for cholesterol and other sterols (Sigma Chemical Company, St. Louis, Mo.). A test standard was prepared containing 10 micrograms of beta-sitosterol. This test standard essentially matched the amount of sterol measured in the 100 micrograms of potato chip oil extract. In fact, the average value based upon five measurements from five potato chips was 9.9% by weight phytosterol. This test result indicated that there was no selective uptake or alternatively exclusion of the phytosterols by the potatoes as they were fried.

Therefore, given that the total weight of oil (fat plus phytosterols) adsorbed into the fried food (i.e., potato chips) appears unaffected by added phytosterols, these phytosterols can effectively dilute and replace a portion of the calorie-containing fat, i.e., triglycerides, that would otherwise have been adsorbed by the food during frying. Thus, a further novel benefit of using phytosterols in edible frying (or baking) oils is to reduce the fat calorie content of the prepared food (e.g., in this Example, by approximately 10%). Without actually performing the above quantitative tests, there would be no evidence that phytosterols can substitute one for one for absorbed fat in fried food.

Concerning the amount of phytosterols provided in a one ounce serving of potato chips, most commercial potato chips contain at least 35% by weight vegetable oil. If this vegetable oil contains 10% by weight phytosterols, then a one ounce serving of chips would provide approximately 1.0 g of phytosterols. At a current bulk price of approximately $10.00 per pound for phytosterols, the cost of these phytosterols in a serving of potato chips would be approximately 2 cents.

Example 5

Surface Oiliness of Food Fried in Phytosterol-Containing Vegetable Oil

When non-esterified phytosterols (e.g., 3% by weight or more of phytosterols) extracted from soybeans (or tall oils) are dissolved by heating in liquid vegetable oil or fat and are subsequently cooled, their crystallization causes the oil to solidify. The degree of firmness of the solid depends upon the phytosterol content of the oil. For example, when heated canola oil containing 10% by weight of dissolved soybean phytosterols is cooled, it solidifies to form a solid that is reminiscent of partially hydrogenated vegetable oil (PHVO). Applicants noticed that potato chips fried (as described above) in this oil seemed to leave less oil on ones fingers than similar chips fried in canola oil alone. Since the property of surface oiliness in fried food is generally considered undesirable, an effort was made to quantitate any difference in this property among the potato chips.

A method was devised to measure the relative surface oiliness of potato chips. Potato-chips fried for 0.1 minute at 180° C. in either canola oil or canola plus 10% by weight soybean oil-derived phytosterols were cooled for at least one hour. An assay of the total fat content of these two groups of chips (method, see Example 4) showed that the former contained 26% by weight canola oil while the latter contained 29% by weight canola oil plus phytosterols. Single potato chips were selected (weighing approximately 1.2 g each) and were gently but thoroughly wiped three times on both sides with a single pre-weighed paper tissue (Kimwipe®, Kimberly Clark Paper Products). Each tissue was weighed on an analytical balance before and after wiping to determine the amount of surface oil absorbed from the chip.

From five canola oil fried chips the following amounts of oil were absorbed into each tissue: 10, 7, 7, 8 and 8 milligrams. From five similar chips fried in canola plus 10% by weight phytosterol the following amounts of oil were absorbed: 3, 3, 3, 2 and 4 milligrams. Therefore, based upon an average of 8 mg versus 3 mg of surface oil, it is estimated that 10% by weight phytosterol added to a cooking oil can reduce surface oiliness of potato chips (and presumably other fried and baked foods) approximately 2-3-fold. A similar result was obtained comparing potato chips fried in corn oil with chips fried in corn oil supplemented with 10% by weight soybean oil-derived prilled sterols. In the latter case, an average of 10 mg of oil was absorbed from each corn oil-fried chip and only 3 mg from each corn oil plus soybean phytosterol fried chip.

Example 6

Recrystallized Non-Esterified Phytosterols in Dietary Fat Provide Significant Reduction in Plasma Cholesterol Levels The aim of this study was to determine the hypocholesterolemic efficacy of free, i.e., non-esterified phytosterols (from soybean oil) in a cholesterol-responsive animal model.

Methods. Animal, diets and study design. Twelve male, 5 weeks old Charles River Mongolian gerbils were used in the study. Gerbils were randomly assigned to 2 groups (6 per group). Gerbils were fed for 4 weeks purified diets containing 0.15% cholesterol, with 30% of energy provided by fat. The overall diet contained either 0% or 0.75% of phytosterols and 13.7% fat (detailed diet composition described in Table 2). Therefore, the fat component of the diet contained either 0% or 5.5% (0.75%÷13.7%) phytosterols. Phytosterols were initially heated in the fat component of the diet to allow their dissolution, and then mixed with the other dietary components. Non-esterified sterols were allowed to freely crystallize in the fat component of the mixture as it cooled. All gerbils were given free access to water, and food was provided daily in the predetermined amounts to meet their caloric requirement for growth and maintenance. Animals were housed in groups of 2-3 and were kept in a controlled environment with a 12 h light-dark cycle (light on 18:00 h).

After 4 weeks of feeding of experimental diets gerbils were fasted overnight (18 h), blood samples were collected under light anesthesia with an EDTA-wetted syringe by cardiac puncture, and after exsanguination, livers were excised and weighed. A portion of each liver was stored at −20° C. until analyzed. Plasma was separated from EDTA-treated blood by centrifugation at 12,000×g for 15 min. and analyzed within 1-2 days.

Plasma lipid analysis. Total plasma cholesterol (TC), high density lipoprotein cholesterol (HDL-C), and triglycerides (TG) were measured by enzymatic assays (Sigma Diagnostics kits—procedures #352 for TC and #336 for TG, respectively). HDL-C was assayed in the supernatant after sodium phosphotungstate-Mg2+ precipitation of lipoproteins containing apolipoprotein B and E (Boehringer Mannheim Diagnostics, procedure 543004) according to the procedure described by Weingard and Daggy (Clin. Chem. 1990, 36: 575).

Results. No significant differences were observed in body weight among gerbil treatment groups, whereas their plasma lipids varied significantly (Table 3).

When compared to controls, gerbils fed diets supplemented with 0.75% phytosterols and 0.15% cholesterol in the form of free phytosterols had somewhat smaller livers (10% less mass) that contained a dramatically reduced level (87-91% reduced) of esterified cholesterol (data not shown). Plasma cholesterol levels in the same gerbils were 53-57% lower than in the control group; HDL-C was lowered to lesser degree (23-29%) and the TC/HDL ratio was improved (decreased) significantly (by 35-40%, data not shown). Plasma triglycerides were not statistically reduced by sterol supplementation.

Discussion and Conclusion. Since non-esterified phytosterols have very limited solubility (1.5% by weight) in dietary fat, and these sterols were added to the dietary fat at a concentration of 5.5% by weight, most (4%÷5.5% or approximately 73%) of these plant sterols were ingested in the dietary fat as a triglyceride-recrystallized phytosterol (TRP) composition or complex. That is, the non-esterified sterols were first dissolved in dietary fat by heating, and then cooled, resulting in their crystallization. Therefore, it is significant and surprising that liver and plasma cholesterol-lowering results described above for the non-esterified sterols were very favorable. More specifically, dietary supplementation with 0.75% non-esterified sterols resulted in over 50% lower plasma cholesterol levels and approximately 90% lower liver cholesteryl ester levels, with a 35% improved (lower) TC/HDL-C ratio. The results of this experiment show that the hypocholesterolemic efficacy of non-esterified sterol preparations recrystallized in fat is comparable to that reported in the literature for fat-soluble esterified sterols and stanols.

Example 7

Non-Esterified Sterols Absorbed by Potato Chips During Frying or Dissolved and Recrystallized in Free Dietary Fat Can Reduce Plasma Cholesterol Levels A. Gerbil Study The aim of this study was to evaluate the hypocholesterolemic efficacy of potato chips enriched with non-esterified sterols (derived from soybean oil) using the same animal model system (see Example 6).

Methods. Animal, diet and study design. Fourteen male, 5 weeks old Charles River Mongolian gerbils were used in the study. All gerbils were randomly assigned into two groups (7 gerbils per group) and were fed for 4 weeks purified diets containing 0.15% cholesterol. The detailed diet compositions are described in Table 3. All diets contained 13.7% by weight fat, with 30% of the dietary energy being provided by the fat. Free (non-esterified) sterols were introduced into the diet at a level of 0.75% by weight in the form of either:

Phytosterol-enriched potato chips. Potato chips were fried in canola oil that was either supplemented or not supplemented with soybean oil-derived phytosterols (10% by weight). When phytosterols were added, they rapidly dissolved in the oil that had been heated to 180° C. prior to frying the chips.

The control diet (see Table 4 for dietary composition) provided no sterols but contained regular commercial potato chips fried in canola oil, to provide the same level of carbohydrate and the standard level of dietary fat (13.7%). All other experimental conditions, including animal maintenance, feeding and sample collecting, and analytical methods were the same as described above (see Example 6).

Hepatic cholesterol analysis. Free liver cholesterol (FC) and esterified liver cholesterol (EC) were determined by HPLC based on the method of Kim and Chung (Korean J. Biochem. 1984, 16: 69). The free cholesterol and cholesteryl esters were separated using a Waters Radial-Pack, C18 column eluted isocratically with acetonitrile/isopropanol (50/50 by volume) at 2.0 ml/min. Absorbance of the eluate was measured at 210 nm using a UV detector. Cholesterol concentrations (free and esterified) were calculated by comparing the peak areas for the samples with those obtained for the calibration standards (Sigma Chemical Co.). To calculate esterified cholesterol, the sum of cholesteryl esters was divided by 1.67 (calculation according to Witztum et al. *J. Lipid Res.* 1985, 26:92).

Results. The body weights of gerbils in both groups, after 4 weeks of feeding were not significantly different, whereas gerbil liver weights, liver cholesterol, and plasma lipid concentrations varied significantly (Table 5). Gerbils fed diets containing phytosterol-enriched potato chips had significantly lower liver cholesterol and plasma cholesterol levels when compared to gerbils consuming a control diet lacking sterols. Consistent with these findings, it is significant to note that gerbils fed a diet containing regular potato chips together with the same amount of nonesterified phytosterols that had been dissolved and recrystallized in an equivalent quantity of canola oil, the plasma and liver cholesterol profiles were found to be very similar to those fed the phytosterol-enriched potato chips (data not shown).

Discussion and Conclusions. The hypocholesterolemic efficacy of nonesterified phytosterols in fortified potato chips was similar to that observed when phytosterols were provided in exogenous dietary fat (fully dissolving and then recrystallizing in free canola oil). The ratio of free phytosterols to fat in the standard fat level diets was 0.75%/13.7% 5.5%. Applicants have shown that the solubility limit of free sterols in vegetable oil is approximately 1.5%. Therefore, as pointed out previously, most (4%÷5.5%=73%) of the free phytosterol that was initially dissolved by heating in the dietary fat (or potato chip fat) was subsequently recrystallized to form what Applicants have termed a triglyceride-recrystallized phytosterol (TRP) composition.

In the present Example, when plant phytosterols are heated and dissolved in a fat which is then cooled, the sterols crystallize together with triglycerides, and the morphology, i.e., the shape and size, of the solid material changes. At 400× magnification, large plates and extended arrays of needle bundles of sterols associated with fat are visible under a microscope. These crystalline phytosterol-triglyceride solids differ in their physical properties (melting temperature and crystalline appearance) from finely milled, and/or microcrystalline particles described by Tiainen et al., that have not first been dissolved and intimately combined with a triglyceride-based fat or oil.

Based upon the results of this experiment we can conclude that frying foods, such as potato chips, in a fat or oil supplemented with free sterols is a convenient and effective way of enriching a food with cholesterol lowering free phytosterols.

B. Human Pilot Study

Having completed the above studies in gerbils, a human pilot study was conducted to assess the hypocholesterolemic efficacy of ingestion of a food enriched with non-esterified phytosterols. For this study, a manufacturer of tortilla chips prepared tortilla chips cooked in either normal fry oil or that oil containing an 8:1 ratio of fat-to-free phytosterols isolated from soybean oil. Two 1 oz bags of test chips provided 1.5 g of phytosterol/day. The final design of the study included 12 moderately cholesterolemic subjects (8 males, 4 females) and two test groups. Subjects initially consumed either the control chips (no sterols) or test chips (with sterols). Because the majority (n=7) of subjects agreed to crossover to the opposite chip after completing their first 4 wk assignment, two sets of data were obtained: a straight comparison of baseline lipid values with values after 4 wk of chips plus sterols (n=10) versus a similar comparison for 9 subjects who ate the sterol-free chips (Table 6) . . . and a second, statistically stronger direct paired-t test for the crossover data (n=7), where each person was their own control for the two different chips (Table 7).

In the statistically stronger comparison (Table 7) both plasma cholesterol and LDL-C, as well as the LDL/HDL ratio, declined about 10-15% (clinically meaningful) without lowering beneficial HDL-C in the 7 crossover subjects when consuming sterol-enriched test chips compared to their response when eating the sterol-free chips. All 7 subjects in the crossover group revealed a drop in LDL between 10 and 40 mg/dl It is also important to note that plasma lipid peroxide which was measured by means of TBARS was significantly decline (9.8±1.7 to 8.2±0.9) when subjects were consuming sterol enriched test chips in comparison to control chips without sterols.

These data confirm that free phytosterols, when adequately dissolved and recrystallized in fat, perform as well as phytosteryl esters in their cholesterol-lowering capacity. These results, coupled with the recent FDA allowance for a hearthealthy claim for >0.4 grams of free phytosterols per serving on such food items, indicate that this form of phytosterol delivery is very beneficial.

Example 8

Non-Esterified Phytosterols Dissolved and Subsequently Recrystallized in Vegetable Oil Triglycerides Can Prevent Oil Separation in Peanut Butter The large solubility differential between non-esterified plant sterols dissolved in hot versus cold vegetable oil can be used advantageously in formulating certain foods. As pointed out previously, most of an initial concentration of 10% by weight plant sterols dissolved in heated vegetable oil, e.g., potato chip frying oil, will recrystallize with triglycerides as the oil is cooled. In the case of potato chips, crystallization of plant sterols in the oil reduces the surface oiliness of the chips. The presence of sterols in a heated vegetable oil was also shown to reduce the amount of polar oxidation breakdown products in that oil as it is heated over a period of time (see Examples 3 and 10).

In the case of other high fat foods such as peanut butter, which contains up to 50% by weight peanut oil, between approximately 3% and 5% by weight of non-esterified plant sterols may be dissolved by heating at 80-100° C. for 1-10 minutes in the peanut butter. Based upon the 50% peanut oil content, the sterols will be present in the oil portion of the peanut butter at a level of approximately twice the initially added levels, i.e., 6%-10% by weight in the oil portion. Applicants have discovered that as little as 3% by weight non-esterified soybean oil-derived prilled phytosterols, dissolved by heating and subsequently cooled in peanut butter, has proven effective in partially solidifying the peanut oil found in a natural peanut butter. This partial solidification prevents the natural oil separation process that is regarded as an undesirable annoyance in natural peanut butter. This percentage of phytosterol provides 0.9 grams sterol per 32 g serving of peanut butter or approximately 100% of the daily amount of plant sterols recommended for achieving a 10-15% reduction in the human plasma cholesterol level. This daily dose is approximately equivalent to the recommended dose of 1.3-1.5 grams of sterol esters (as provided in commercial cholesterol-reducing margarines) in which only 60% by weight of the sterol esters consists of the active sterol moiety.

Example 9

Non-Esterified Phytosterols Dissolved and Subsequently Recrystallized in Cocoa Butter Triglycerides Can Be Incorporated into Chocolate Cocoa Butter has a melting temperature above room temperature but below body temperature (37° C.). This property allows chocolate, a processed food containing approximately 30% by weight cocoa butter, to remain solid at room temperature, and to melt in ones mouth. Soybean oil phytosterols were added to cocoa butter at a concentration of between 10% and 30% by weight, and were dissolved by heating. The cocoa butter was subsequently cooled and solidified.

A test of the softening and melting temperatures for the phytosterol-supplemented (see above) and unsupplemented cocoa butters showed that with 10% phytosterols, both cocoa butters were softening at approximately 30° C., and melted at approximately 34° C. At 34° C., while cocoa butter became transparent, phytosterol-supplemented cocoa butter remained translucent to opaque, and exhibited a greater viscosity owing to the presence of suspended phytosterol particles. Under the light microscope (800× magnification), the recrystallized phytosterols appeared as a fine suspension of slender needles and microparticules approximately 1-5 microns in width or diameter. Thirty parts cocoa butter that had been phytosterol-supplemented with 10% by weight phytosterols (converted to TRPs), was successfully incorporated into seventy parts of a sweet chocolate composition. The phytosterols (3% of the chocolate by weight) had a negligible effect on the taste and texture of this processed food. Chocolate (80 parts by weight) was also supplemented with 20 parts by weight cocoa butter that contained 30% by weight phytosterols as TRPs. This yielded a chocolate containing 6% phytosterols as TRPs. Lower phytosterols in chocolate (3% by weight) would be appropriate to use in formulating variety of chocolate bars. Whereas, higher phytosterol in chocolate (6% by weight) could be use to produce chocolate candy or dietary supplement chews.

Example 10

Oxidative Stabilization of Vegetable Oils Fortified with Non-esterified Phytosterols in Production Environment In addition to the hypocholesterolemic effect of the ingestion of fat-recrystallized phytosterols, we discovered that vegetable oils fortified with free phytosterols are substantially stabilized against oxidation (and rancidity of stored product). This stabilization was tested in a commercial tortilla chip production setting, with analysis according to AOCS Recommended Practice Cd 12b-92.

The OSI measurements (each value is an average of duplicate samples, with testing carried out at 110 degrees C.) were determined by the Archer Daniels Midland (ADM) company (Decatur, Ill.) using high oleic safflower oil samples that had been used to prepare tortilla chips. The chips were prepared, and the oil samples harvested by the Warnock Food Company from heated tanks used to fry the tortilla chips. These tortilla chips (prepared from standard masa flour plus 1% by weight salt) were used in the human pilot study reported in Example 7. After frying, the tortilla chips contained 22% by weight of oil.

When phytosterols were included in the oil at a level of 12% by weight, a serving of 1 oz. (28 g) of the chips provided 22%×12%×28 g or 0.74 g phytosterols per serving. The original safflower oil (obtained from Adams Vegetable Oil, Arbuckle, Calif.) contained 77% by weight oleic acid, 14% linoleic acid, and 8% palmitic plus stearic acids. This oil had a stability index (OSI value) of 11.3 hours before frying was commenced. After the frying of approximately 150 pounds of tortilla chips, and maintaining the oil at a temperature of 185 degrees C. for 6 hours, the OSI value of the oil had decreased to 9.5 hours.

Subsequently, fresh safflower oil and unmodified (non-esterified) soybean phytosterols (provided by ADM) were used to prepare an oil blend containing 88% by weight safflower oil and 12% by weight phytosterols. This oil blend had a stability (OSI value) of 14.9 hours before frying was commenced. After frying approximately 132 pounds of the tortilla chips, and maintaining the oil at a temperature of 185 degrees C. for 6 hours, the OSI value of the oil remained essentially the same (15.1 hours).

We concluded that non-esterified phytosterols exert an antioxidant effect on a heated edible oil that carries the phytosterols, where the edible oil may be subjected to the oxidative impact of heat combined with air and food contact. The phytosterols, added at a level of 12% by weight, actually increased the oxidative stability of the original oil from 11.3 hours to 14.9 hours as measured prior to heating.

The phytosterols also reduced the loss in oxidative stability that accompanies heating of edible oils, e.g., compare the decrease in OSI value from 11.3 to 9.5 hours during 6 hours of heating and frying with safflower oil lacking phytosterols versus the OSI stability that is maintained in the presence of phytosterols (14.9 and 15.1 hours respectively).

Furthermore, for application to prepared foods, we have observed that the shelf life (freshness) of phytosterol-fortified, fat-containing processed chips is extended owing to oxidative stabilization of the fat.

Example 11

Heating or Baking of Free Phytosterols Applied to Fat-Containing Foods to Form TRPs Several alternative methods have been described for introducing TRPs into prepared foods. These include: (i) frying a food product in heated fat containing dissolved phytosterols and allowing the product to cool, during which the TRPs are formed within the food, and (ii) baking a food with a shortening containing a mixture of phytosterols and fat during which the heated phytosterols dissolve in the fat and subsequently recrystallize with the fat during cooling to form TRPs.

With the new method described herein, the bioavailable TRP complex is also formed, but it is produced in situ, i.e., within the food, thereby eliminating the need to provide a separate TRP-based shortening. Thus, any changes in food manufacturing methods that may be inconvenient and/or costly for the manufacturer are minimized. In the present Example, either uncooked or cooked foods (baked, grilled, fried or otherwise heated) that either contain fat as an ingredient or that are externally coated with some fat can be contacted (e.g., by dusting, tumble-coating) with an appropriate quantity of phytosterol solids (powder or granular) so that the phytosterols adhere to the food. Adhesion can be promoted by any of a variety of methods including pre-coating the food with a liquid such as oil, water, or raw egg white. The phytosterol-coated food is subsequently baked or otherwise heated to appropriate temperature and for an appropriate time that together are sufficient to cause the phytosterols to melt and combine with fat, i.e., triglycerides, within the food, e.g., snack chips such as potato chips. Alternatively, the phytosterols dissolve directly into liquid fat present on the food's surface. As the food begins to cool, this liquid mixture is absorbed into the food, and TRPs are formed. This method for producing TRPs in foods is now further described.

In one test of this method, commercially baked white flour-based pita bread (receipe containing no added fat) was cut into squares measuring approximately 2 in.×2 in. Forty grams of these squares were coated with 3% by weight corn oil (1.2 g). A 0.4 g quantity of powdered soybean oil-derived non-esterified phytosterols obtained from Archer Daniels Midland Company (Decatur, Ill.) was placed in a plastic bag and shaken with the oil-coated pita bread squares until all of the powder adhered to the bread, producing uniformly coated pita bread surfaces. The pita bread was then re-baked at 325° F. for 8 minutes to produce crisp pita chips. At the time of removing the chips from the oven, an oil sheen was briefly visible on the chips. This oil coating rapidly disappeared as the pita chips cooled. In the course of this re-baking, the pita bread lost approximately 10 g of moisture equal to about 25% of its original weight. The resulting yield was 31 g (approximately 1 serving) of pita chips. Examination of the surface of the chips showed that the granular phytosterol material had been absorbed. Since phytosterols are soluble in hot oil, it is reasonable to conclude that they had combined with the oil and been absorbed into the pita chips. The phytosterol concentration in the oil blend would be 0.4 g/1.6 g=25% by weight. Applicant has measured the melting temperature of the above phytosterols, and found it to be approximately 285° F. (140° C.), which is considerably below typical baking temperature, thereby assuring efficient mixing of oil or fat with the now melted phytosterols. Scaling up of this method can be achieved using any one of a number of procedures. For example, the pita bread squares may be spray-coated with an appropriate amount of edible oil, and the product can then be tumble-coated in a drum containing seasonings combined with the powdered phytosterols.

In the case of prepared foods already containing a moderate level of fat, e.g., snack chips, crackers and cookies, a small amount of oil tends to be expressed onto the surface of the food as it bakes. If phytosterols are applied to the surface of the food before or during the baking, or during another heating step, the fat on the food's surface can actually dissolve applied phytosterols. As the baked food cools and the evolution of water vapor and steam ceases, the surface fat with dissolved phytosterols appears to be reabsorbed into the food. The only process modification that is made in this procedure is powder-coating, spraying or otherwise applying an appropriate amount of the phytosterols (e.g., 0.4 g-0.8 g per serving of the food). Since the phytosterols will stick to either unbaked food (e.g., batter) or food that is lightly coated with oil or another edible liquid, there is no technical obstacle to utilizing this method.

Example 12

Increasing the Proportion of Phytosterols Relative to Triglycerides in the TRP Complex Previous research had shown that up to at least 25% by weight phytosterols could be co-crystallized with 75% by weight fat to form a substantially homogeneous TRP complex with a defined melting point. The ability of increasing proportions of phytosterols to co-crystallize with decreasing proportions of fat, i.e., triglycerides, to form TRP complexes was subsequently investigated. Accordingly, between 10% and 75% by weight soybean oil-derived phytosterols were combined with between 90% and 25% by weight edible oil or fat. Refined, bleached and deodorized (RBD) corn oil and beef tallow were separately combined with the soybean-derived non-esterified phytosterols to determine whether different sources of triglycerides caused any obvious difference in the TRP complex that was formed. For this purpose, the various proportions of phytosterol in fat were dissolved by heating to approximately 150° C. (forming clear solutions), and allowed to cool and fully recrystallize at room temperature. Each sample was then slowly reheated to determine the melting temperature of that particular TRP complex. The results are provided below.

| Weight % Phytosterols | Weight % Triglycerides | TRP Melting Temperature |
| --- | --- | --- |
| 10 | 90 corn oil | 60–63° C. |
| 10 | 90 tallow | 61-63° C. |

-continued

| Weight % Phytosterols | Weight % Triglycerides | TRP Melting Temperature |
|---|---|---|
| 15 | 85 corn oil | 79-81° C. |
| 15 | 85 tallow | 79-81° C. |
| 20 | 80 corn oil | 89-90° C. |
| 20 | 80 tallow | 89-91° C. |
| 25 | 75 corn oil | 93-94° C. |
| 25 | 75 tallow | 92-93° C. |
| 50 | 50 corn oil | 118-119° C. |
| 50 | 50 tallow | 118-119° C. |
| 75 | 25 corn oil | 131-132° C. |
| 75 | 25 tallow | 132-133° C. |
| 100 | 0 | |

These data indicate that the source of triglycerides and their content of saturated and polyunsaturated fatty acids has little effect on the melting temperature of the complex since tallow contains approximately 50% saturated and only 4% polyunsaturated fatty acids whereas corn oil contains approximately 13% saturated and 59% polyunsaturated fatty acids. However, the proportion of phytosterols versus triglycerides in the TRP complex has a substantial effect on the melting temperature of the complex; With a 25% decrease in phytosterol content within the complex (75% vs. 100% phytosterols), the melting temperature decreases approximately 8° C. (132° C. versus 140° C. for pure phytosterols). With a 50% by weight decrease in phytosterols (50% vs. 100%), the melting temperature decreases approximately 22° C. (118° C. versus 140° C.). When the 50% phytosterol content is then again halved to 25% (75% fat added), the phytosterol melting temperature decreases approximately 47° C. (93° C. versus 140° C.).

To answer the question of whether the TRP complexes described above, that contain proportions of phytosterols in excess of 25% by weight, can still effectively reduce plasma LDL cholesterol levels in vivo by addition to the diet, gerbils were utilized as a model system. This mammal has proven to be an excellent model system for the human plasma cholesterol response as demonstrated previously by Hayes et al.

Example 13

Beneficial Sparing of Carotenoids in Human Plasma by Dietary TRPs

Human plasma samples obtained during the pilot study described in Example 7, and that had been frozen and stored for several months at −20° C. were thawed and analyzed for alpha and beta-carotene levels. The purpose of this analysis was to determine whether regular dietary intake of non-esterified phytosterols in the form of TRPs (1.5 grams per day of phytosterols) would result in any depletion of carotenoids in the blood. This question was of interest because of previous reports that extended dietary intake of esterified phytosterols might contribute to a modest (but still undesirable) decrease in the plasma level of beta-carotene. With the cross-over design of this clinical study it was possible to compare the effect of consuming TRP-fortified tortilla chips for 4 weeks with the effect of consuming similar tortilla chips lacking these phytosterols (also for 4 weeks). Accordingly, plasma samples from seven individuals were tested for alpha and beta-carotene levels. The results are shown in Table 8. These include absolute plasma carotene levels measured (micrograms per deciliter) as well as the ratio of alpha, beta and alpha+beta carotenes to total cholesterol (TC), expressed as micrograms carotene per millimole of cholesterol.

Within the limits of this experiment, there is no statistical change (and certainly no undesirable decrease) in the level of either alpha or beta-carotene caused by consuming tortilla chips fortified with TRPs that provided 1.5 g/d phytosterols for a period of 4 weeks (Table 8). The percentage change in carotene levels following the 4 wk regimen of phytosterols was calculated relative to both the baseline level of the carotenes measured at the beginning of the study (column 4) and relative to the carotene levels measured after the individual had consumed regular tortilla chips (without phytosterols) for 4 wk (column 5). These results are important because they demonstrate that a beneficial decrease in LDL cholesterol (Table 7) can be achieved by consuming non-esterified phytosterols (as TRPs) without any detectable decrease in the plasma level of either alpha or beta-carotene.

Example 14

Oxidative Stabilization of Fish Oil Triglycerides Containing DHA and EPA Fatty Acids by Combining with Free Phytosterols Fish oil as well as other edible marine oils such as algae oil whose triglycerides contain nutritionally beneficial long chain polyunsaturated fatty acids, e.g., EPA (20:5 eicosapentaenoic acid) and/or DHA (22:6 docosahexaenoic acid) are used as direct food ingredients and nutritional supplements. With these uses, the polyunsaturated fatty acids are susceptible to oxidation in air and rancidity, with the concomitant development of an undesirable fishy flavor. Antioxidants are often included in DHA and EPA-containing edible oils. For example, 100-200 ppm of TBHQ and/or 1000 ppm of mixed tocopherols (aka, vitamin E) may be added to refined menhaden fish oil or to algae oil to retard spoilage. Commercial sources for refined, bleached and deodorized fish oil include, for example, Omega Protein, Inc., (Hammond, La.) and Source Food Technology, Inc., (Durham, N.C.). The latter company offers a refined, cholesterol-reduced fish oil (typically 4-5-fold reduced, i.e., containing approximately 0.1% by weight cholesterol rather than 0.5%), and containing 20-30% by weight of DHA and EPA. On the other hand, refined oil from fermentation-grown algae is available from Martek Biosciences Corp. (Columbia, Md.), and contains approximately 20% by weight DHA, rather than a mixture of DHA and EPA.

Applicants have tested the above purified, cholesterol-reduced menhaden fish oil (CR-FO), obtained from Source Food Technology, for its ability to be oxidatively stabilized by combining with non-esterified phytosterols (soybean oil-derived, obtained from ADM Inc., Decatur, Ill.). The "oxidative stability index" (OSI) whose numerical value provides a relative measure of resistance to rancidity (and relative shelf life) was measured for five CR-FO blended fish oil samples containing either 0%, 5%, 10%, 20% or 30% phytosterols. These blends were produced by briefly heating the mixtures of fish oil and granular phytosterols to approximately 100° C. (while agitating) until fully dissolved. The solutions were immediately chilled in ice (resulting in co-crystallization of the TRP complex of phytosterols and fish oil), and frozen until tested. OSI values (testing at 110° C.) were measured by Medallion Laboratories (Minneapolis, Minn.) and were as follows:

| Phytosterol:Fish Oil Content (percentage) | OSI (hours) |
|---|---|
| 0:100 | 3.7 |
| 5:95 | 4.2 |
| 10:90 | 4.3 |
| 20:80 | 4.8 |
| 30:70 | 5.7 |

The above data clearly indicate that as the phytosterol content in the mixed composition is increased, the oxidative stability of the composition is significantly increased.

Example 15

Phytosterols Recrystallized as TRPs in Edible Oils Containing DHA and/or EPA Fatty Acids as Nutritional Supplements and Direct Food Additives In addition to phytosterols with their LDL cholesterol-lowering benefits and the consequent decreased risk of coronary heart disease (CHD) provided by daily ingestion of adequate amounts of phytosterols, the consumption of adequate amounts of omega-3 fatty acids has been found to protect the body against CHD. In a recent review of the scientific literature on the cardiovascular health effects of consuming both phytosterols and omega-3 fatty acids, entitled "Combination of phytosterols and omega-3 fatty acids: a potential strategy to promote cardiovascular health," Normen et al. (Cardiovascular and Hematological Agents, 2, 1-12, 2004) provide a substantial literature that indicates omega-3 fatty acids can beneficially reduce plasma triglyceride (TG) levels, increase LDL-particle size, decrease collagen-induced platlet aggregation and inhibit thromboxane $B_2$ production, reduce fibrinogen concentrations, increase endothelial function and reduce blood pressure, as well as providing anti-arrhythmic protection. There is general agreement that three omega-3 fatty acids are principally responsible for providing this CHD protection. These include DHA (22:6), EPA (20:5) and alpha-linolenic acid (18:3).

As described in Example 14, non-esterified phytosterols have been recrystallized in marine oils to produce TRPs. These mixed compositions are useful in producing nutritional supplements and direct food additives that provide the health benefits of both the phytosterols and the omega-3 fatty acids. For example, regular menhaden oil, cholesterol-reduced menhaden oil, algal oil, flax oil, or any other triglyceride source rich in omega-3 fatty acids can be blended and heated with suitable amounts of phytosterols to dissolve the phytosterols. The oil-phytosterol solution is then cooled either alone or in combination with other edible ingredients to allow formation of the bioavailable TRPs. For example, TRPs have been produced containing 30%-40% by weight phytosterols and 60%-70% fish oil. Accordingly, 30% weight non-esterified soybean oil-derived mixed phytosterols was heated with 70% by weight cholesterol-reduced menhaden oil (Source Food Technology, Inc., Durham, N.C.), and the resulting solution was cooled for packaging in gelatin capsules. Each 1 g capsule can then provide 300 mg non-esterified phytosterols and 700 mg fish oil (25% omega-3 fatty acid=175 mg of which approximately half is EPA and half is DHA). Consumption of 3-6 such capsules per day (preferably 1-2 per meal), provides biologically effective amounts of phytosterols (0.9-1.8 g) and omega-3 fatty acids (0.5-1.0 g). Use of commercially available omega-3-enriched-fish oil fractions allows even greater amounts of EPA and DHA to be included in such nutritional supplement capsules. It has been suggested that individuals should consume 0.25% of their dietary energy in the form of omega-3 fatty acids, i.e., 0.25%×2000 kcal=5 kcal. Given the accepted value of 9 kcal per gram fat, 5 kcal of omega-3 fatty acids would correspond to 0.55 g. Three of the above capsules provide nearly this amount of omega-3 fatty acids (525 mg), while also providing 900 mg phytosterols. The latter amount slightly exceeds the current minimum daily intake (800 mg) for achieving a reduced risk of coronary heart disease. The above TRP preparations are also suited for use as direct food additives to obtain the same health benefits associated with consuming omega-3 fatty acids and non-esterified phytosterols.

Example 16

TRP Dietary Supplement Combining Phytosterols and Fish Oil Provides Bioavailable Constituents Together with phytosterols and their LDL cholesterol-lowering benefits, omega-3 fatty acids have been shown to provide many additional health benefits (for review, see Normen et al., Cardiovascular and Hematological Agents, 2, 1-12, 2004) including the lowering of plasma levels of triglycerides in humans (another risk factor in developing CHD). The object of the gerbil model experiment that follows was to test the dietary bioavailability (biological effectiveness) of non-esterified phytosterols and omega-3 fatty acids provided in fish oil that had been combined and converted into a TRP complex. Fish oil (cholesterol-reduced menhaden oil obtained from Source Food Technology, Inc) and phytosterols (soybean oil-derived, obtained from ADM Inc., Decatur, Ill.) were heated in a 70:30 weight/weight ratio to approximately 100° C. with stirring until fully dissolved. After cooling to room temperature to allow formation of the TRP complex, this TRP material was included in purified gerbil gel diets (see Table 9). First, a control Diet 1 was formulated containing neither fish oil nor phytosterols. Phytosterols alone were added to Diet 2 at a concentration of 0.75% by weight. Fish oil was added to Diet 3 at a concentration of 1.75% by weight. Finally, in the combination Diet 4, 1.75% fish oil and 0.75% phytosterols were combined in the TRP complex described above.

The amount of fat in the diet (outside the fish oil contribution) was kept very low to minimize any influence of dietary fat on the bioavailability of the non-esterified phytosterols. Thus, the base diet contained only 12% of the energy (12% en) from fat, and was high in glucose. In principle, this diet could drive production of plasma triglyceride (TG) and secretion by the liver. This base diet was designed to allow fish oil omega-3 fatty acids (see diet 3) to show an effect on possibly controlling TGs as well as possibly the level of plasma total cholesterol (TC). The cholesterol intake of the basal diet was intended to drive TC up to about 200 mg from a typical 75-80 mg best diet. It was anticipated that the phytosterols (Diet 2) would decrease TC, while the combination diet (diet 4) of phytosterols+fish oil might provide either additive or synergistic effects of decreasing TG and TC in plasma as well as in the liver. In addition, maintaining the phytosterols concentrated in a small amount of fat within the total diet was an important aspect of the design to answer the question of whether phytosterols could be effective in low fat diets and food products, or alternatively, require dissemination in larger amounts of fat dispersed throughout the diet.

After one month of feeding, the animals were sacrificed and analyzed (see Table 10). The results are interesting, showing that both the phytosterols and fish oil were separately effective in lowering plasma and liver cholesterol and plasma tocopherols and peroxides (TBARS). However the reduction in these levels by phytosterols alone was larger than the effect produced by fish oil alone (compare diets 2 and 3). Also, with phytosterol, the ratio of TC/HDL-C decreased significantly whereas with fish oil was practically unchanged. Furthermore, phytosterols significantly improved the ratio of tocopherol (antioxidant) to cholesterol, while fish oil in this gerbil model caused no measurable improvement. As for the TRP complex (diet 4), the combined effect of phytosterols and fish oil was greater than either agent alone. Similarly, plasma peroxide (TBARS) level decline for the TRP complex (diet 4) was greater (48% decline in comparison to diet 1) than decline produced by fish alone (32%) or phytosterol alone (25%). It is noted that this diet 4 produced the lowest liver weight which can be attributable to the greatest reduction in liver cholesterol accumulation (68% reduced with phytosterols, 31% with fish oil, and 82% with the combination). Also, diet 4 showed the lowest plasma TC and TG levels. At the same time the TC/HDL ratio and the ratio of tocopherol/cholesterol for diet 4 was approximately the same as with phytosterol alone (diet 2), but significantly better than fish oil alone (diet 3).

High intake of fish oil in humans has been shown by others to significantly reduce HDL levels. Therefore, it is not surprising that the level of HDL measured with the fish oil group (diet 3) was significantly lower than with the phytosterol group (diet 2).

Based on these findings, we conclude that the TRP complex of fish oil+phytosterols (70:30) was functional in concentrated form as it was provided, and that it should function in humans to block cholesterol absorption. Since typical human diets contain much greater amounts of fat (approximately 30-35% energy from fat rather than 12-15% used in this experiment), it is anticipated that the combination of fish oil and phytosterols in the TRP complex, when consumed by humans, will be especially beneficial in ameliorating hypercholesterolemia.

Example 17

High Proportions of Phytosterols in the TRP Complex Remain Effective in Reducing Plasma Cholesterol Levels When adding phytosterols in the form of TRPs to processed food products, it is often possible to provide and combine considerably more fat than phytosterols in producing the mixed crystalline TRP complex. For example, Applicants have determined that combining 10%-20% by weight phytosterols with 80%-90% vegetable oil or other fat, provides a frying oil that can deliver an appropriate amount of non-esterified phytosterols as measured on a "per serving" basis. Thus, approximately 450 mg-900 mg phytosterols will be absorbed by a one ounce serving (28 g) of fried food product if that product absorbs, for example, 15% by weight fat, and that fat contains 10-20% phytosterols. However, with some food products containing limited amounts of fat, and dietary supplements packaged in space-limited gelatin capsules for example, it may be necessary to combine a weight proportion of phytosterols that approaches or exceeds the amount of fat in the TRP complex. TRP complexes containing increasing proportions of phytosterols are described in Examples 12 and 14 above. Such complexes containing animal fat, e.g., tallow, lard, fish oil, or vegetable oil, e.g., corn oil, canola oil, or even modified fats such as interesterified fats, are provided as examples.

In the present Example, to test the biological efficacy (cholesterol controlling ability) of such TRP complexes, three groups of gerbils were fed the same basal diet as those gerbils describe in Example 16, except that two diets were supplemented with TRPs containing different proportions of phytosterols. The first group (diet 1) received the control diet described in Example 16 containing no phytosterols. The second group (diet 2) received phytosterols in which the TRP complex added to the diet contained 12.5% by weight non-esterified phytosterols and 87.5% by weight of fat (the tallow, milkfat and lard blend described in Table 9). The third group (diet 3) similarly received TRPs, but these contained 70% by weight non-esterified phytosterols and only 30% by weight of the same fat blend. Unlike many of the previously utilized TRPs, the latter TRP complex contained more than ⅔ by weight phytosterols and less than ⅓ by weight fat. It formed a notably waxy material that was firm to the touch.

Results from the gerbil nutritional study were as follows: Gerbils fed diets containing either a moderate (12.5%) or a high proportion (70%) of phytosterols provided as TRPs showed similar body weights but significantly reduced liver and plasma cholesterol levels when compared with gerbils consuming the control diet (lacking phytosterols). With both the 12.5% and 70% levels of phytosterols in the TRP complex, liver cholesterol levels were reduced (versus the control diet) to almost the same extent (64% and 60% reductions, respectively). The extent to which these same two TRP complexes in the diet reduced plasma total cholesterol (TC) was smaller in magnitude (35% and 21% decreases, respectively). Similarly, the ratios of TC to HDL-cholesterol were also reduced with these diets (25% and 18% decreases, respectively). It is noted that the numbers within each parenthesis did not differ statistically.

Additionally, plasma tocopherol that beneficially reduces the oxidation of plasma cholesterol was measured, and is reported as the ratio of plasma α-tocopherol/cholesterol. This ratio increased in gerbils fed diets containing both levels of phytosterols (12.5% and 70%) in the TRP complexes (24% and 17% increases respectively, versus the control diet). Based upon the results from this experiment, it is anticipated that dietary supplements and enriched foods containing highly concentrated TRP complexes, e.g., 70%-75% by weight phytosterols and only 25%-30% by weight fat, will be effective in reducing cholesterol levels in mammals.

Example 18

TRPs Added to Sauces and Condiments to Counteract Dietary Cholesterol

As previously described, phytosterols when ingested in a bioavailable form such as TRPs, can be effective in blocking absorption of dietary cholesterol and lowering plasma cholesterol levels. Therefore, TRPs that are ingested together with cholesterol-containing foods, can be effective in controlling increases in plasma LDL levels caused by dietary cholesterol. Accordingly, Applicant has combined TRPs into food condiments such as tomato catsup and mustard that are applied to, or mixed with cholesterol-containing meats and seafoods (e.g., hamburgers and hotdogs, chicken and fish), and eaten. TRPs can also be combined into food sauces (e.g., entree sauces such as spaghetti sauce and dessert sauces such as fudge and chocolate sauce) that are applied to, or mixed with cholesterol-containing foods (e.g., meats, fish, and dairy products including butter, cheese, egg powder and ice cream) and eaten. Empirical testing has shown that sauces and condiments that are thick or viscous, and blended with TRPs, tend to better retain the TRPs as a homogeneous suspension of small particles.

As an example, thick tomato paste-based catsups have been successfully fortified with TRPs. Catsup was prepared pursuant to the FDA requirements for specific standardized canned vegetables CFR Title 21 Section 155.194 (catsup). Subsequently, a 50 serving (850 g) batch of "catsup with added phytosterols" was then prepared. Calculated on a "per serving" basis (17 g for catsup), 425 mg soybean-derived phytosterols were dissolved by heating to approximately 100° C. in 1.20 g of a blended vegetable oil containing a mixture of olive and canola oils. This quantity of phytosterols was selected because current FDA guidelines require that a serving of food contain at least 400 mg of free phytosterols (with a total dietary consumption of at least 800 mg per day) in order to establish the health claim of reducing the risk of coronary heart disease. The proportion of phytosterols in the above phytosterol-oil mixture was 0.425/(1.20+0.425)=26%. The efficacy, i.e., bioavailability, for reducing plasma cholesterol, with non-esterified phytosterols in the form of TRPs at approximately this concentration in edible oil has been previously shown (Example 16). When still warm, this phytosterol-oil mixture was blended into 15.4 g of a conventional tomato and vinegar-based catsup that had been pre-warmed to approximately 70-80° C. TRPs formed during cooling were found to remain uniformly dispersed throughout the catsup. Alternatively, the heated oil-phytosterol mixture could be cooled before blending, allowing the TRPs to fully form. These TRPs were then blended into catsup that was then heated until the TRPs were uniformly dispersed throughout the catsup. The catsup was heated, pasteurized and cooled to a filling temperature (approximately 60-80° C.) and aseptically filled into either plastic (PET) or glass bottles.

Mustard condiment, cocktail sauce, tartar sauce, barbecue sauce, steak sauce, pasta sauce, pizza sauce, were similarly prepared. A serving of mustard is generally considered 10 g. To provide a level of 425 mg phytosterols in approximately 1.2 g vegetable oil, a receipe was followed in which approximately 8.4 g mustard was combined with 1.625 g of TRPs consisting of the above amounts of phytosterols and oil. As with catsup, the phytosterols were first dissolved by heating in oil and then combined with the mustard.

Example 19

Low Levels of Phytosterols in a Trans Fatty Acid-Free Frying Oil for Reducing Absorption of Dietary Cholesterol Present in Fried Meat and Fish Products Low levels of non-esterified phytosterols (e.g., between 1.5% and 5% by weight tall oil-derived or soybean oil-derived phytosterols) may be easily dissolved by heating in a trans fatty acid-free frying oil. The frying oil that is selected is preferably resistant to premature oxidation, and therefore should contain limited amounts of linoleic and alpha-linolenic acid, e.g., a palm oil-based frying oil, or any of a variety of high oleic vegetable oils, or a blend of a palm-type oil with another vegetable oil. It is preferable that the frying oil is pourable at commercial kitchen temperatures (24-27° C.) to facilitate filling and topping off of the frying tanks. Accordingly, the palm olein fraction of palm oil with its lower softening point (18-24° C.) is preferred over whole palm oil (softening point, 36-40° C.). The so-called "super-olein" fraction of palm oil is also useful with its even lower softening point (approximately 15° C.), but it is typically 30-45% more costly per pound than palm olein (e.g., $0.40 vs. $0.28). To cost-effectively further reduce the softening point of a palm olein-based frying oil (for an oil that remains pourable even at lower room temperatures, e.g., 20-24° C.), Applicants have formulated palm blends (e.g., 10%-50% by weight super-olein with approximately 50%-90% palm olein). These blends (as well as palm olein alone) were then combined with non-esterified phytosterols. For overall oxidative stability, the frying oils should contain less than approximately 15% by weight linoleic acid and less than 5% by weight alpha-linolenic acid (preferably less than 3% alpha-linolenic acid). The phytosterol-supplemented oil is useful for frying foods such as meats and fish that contain endogenous cholesterol. French fries, fried onion rings and the like that are free of cholesterol but that are eaten together with cholesterol-containing foods such as as meats, fish or dairy products may be fried in the same oil, thereby absorbing and subsequently delivering additional dietary phytosterols. For example, a small serving of French fries (74 g) typically contains approximately 14 g of absorbed frying oil. If the oil is fortified with between 1.5% and 5.0% by weight phytosterols, the small serving of French fries will contribute between 210 and 700 mg of phytosterols to ones diet (800 mg per day non-esterified phytosterols is the current minimum recommended daily intake of phytosterols for achieving a decrease in the risk of CHD).

One receipe for a palm oil-based frying oil was formulated as follows: Approximately 97% by weight palm olein was blended with 3% by weight canola oil. Regular vegetable oils, or preferably high oleic variants of canola, safflower or sunflower oil are useful. The palm oil (or in this case palm olein-canola oil blend) was supplemented with 1.5% by weight non-esterified soybean oil-derived phytosterols, which together were heated to dissolve the phytosterols. This frying oil was used to fry breaded chicken parts (chicken breast tenders produced by Bell and Evans, Fredericksburg, Pa.) at a temperature of 355° F. (180° C.) for 8 minutes (see Table 14). From data published by the KFC Corporation (Louisville, Ky.) in their "Nutrition Guide" (see PDF file online at www.kfc.com/kitchen/nutrition.htm) it is estimated that oven roasted chicken breast without skin or breading contains 3%-4% by weight fat. Therefore, in Table 14 where the average extractable fat content of the fried breaded chicken was approximately 14%, it is estimated that approximately 14%-4%=10% (10 g oil per 10 g fried chicken) was attributable to exogenous oil (non-chicken fat). If most of this 10 g was attributable to Applicant's frying oils (that containing either 1.5%, 3.0%, 4.5% or 6.0% by weight phytosterols), then the amount of phytosterol extracted per 100 g fried chicken should have been approximately 150 mg, 300 mg, 450 mg and 600 mg. With the exception of the sample prepared using the lowest level (1.5% phytosterols), the other samples of fried chicken contained the amounts of phytosterols anticipated from the 10% by weight measured and calculated uptake of frying oil. Most of this uptake was by the breaded coating.

From the FDA guidelines suggesting a dietary intake of 800-1500 mg phytosterols per day to counteract the typical American dietary intake of 300-400 mg cholesterol per day, it is estimated that between a 2:1 and a 5:1 ratio of phytosterols to cholesterol is useful in mammals for inhibiting absorption of the cholesterol within a mixture of ingested food. A frying oil containing 3% dissolved phytosterols, in which approximately 10% by weight of the oil was absorbed or exchanged with the breaded chicken, provided this 5:1 ratio of phytosterols to chicken cholesterol (252 mg phytosterol:57 mg cholesterol per 100 g chicken). Not surprisingly, doubling the concentration of phytosterol to 6% resulted in approximately twice the uptake of phytosterols (550 mg per 100 g chicken).

The same strategy can be employed with processed fish products. Fish contains approximately the same weight proportion of endogenous cholesterol as chicken (45 mg/100 g for cod, and approximately 80 mg/100 g for salmon). Applicant has determined that typically prepared fried breaded fish products, e.g., fish sticks and fish cakes produced by Gorton's (Gloucester, Mass.), absorb an amount of frying oil (10%-14% by weight) similar to that of breaded chicken. Therefore, similar concentrations of phytosterols can be added to the fish frying oil to counteract the fish's endogenous cholesterol.

Example 20

TRPs Combined within Cholesterol-Containing Foods Such as Butter or Ground Meat to Counteract Cholesterol Content As previously described, phytosterols when ingested in a bioavailable form such as TRPs, can be effective in blocking absorption of dietary cholesterol and lowering plasma cholesterol levels. Therefore, TRPs that are ingested together with cholesterol-containing processed foods such as butter, ice cream, ground hamburger meat and the like are expected to be effective in controlling increases in plasma LDL levels caused by the dietary cholesterol in the food product. Accordingly, TRPs can be introduced into such food products by a variety of means.

In the case of groun meat such as hamburger beef (or other ground meat and fish products such as chicken nuggets, pork patties, fish sticks and the like), a fried hamburger typically contains between 50 mg and 100 mg cholesterol. If the cholesterol content in a 150 g hamburger is approximately 75 mg, and the above ratio of 5 parts added phytosterol to one part endogenous cholesterol in the food product is followed (see Example 19), then approximately 400 mg of non-esterified phytosterols would be added to "neutralize" the cholesterol content in the hamburger. When 400 mg of powdered phytosterols are blended into a typical ground beef (containing at least 10% fat) that is subsequently fried, the phytosterols rapidly dissolve in the heated fat (tallow) portion of the hamburger. Upon cooling, the phytosterols recrystallize with the tallow to form TRPs that have been shown effective in reducing or preventing cholesterol absorption when ingested. At a cost of approximately $20 per kg phytosterols, the cost of the 400 mg added phytosterols would be only 0.8 cents.

For neutralizing the cholesterol present in butter, several different methods can be utilized for introducing non-esterified phytosterols into the butter. A typical butter contains approximately 220 mg cholesterol per 100 g or approximately 1.00 g cholesterol per pound. Using for example, the above 5:1 phytosterol:cholesterol ratio, approximately 1.1 g non-esterified phytosterols can be added per 100 g butter (or 5 g phytosterols per pound) to "neutralize" the endogenous cholesterol. However, to produce and incorporate the desired TRPs without damaging the butter's emulsion structure (to avoid excessive heating), Applicants pre-dissolve the phytosterols by heating in a separate portion of fat or oil such as anhydrous butter fat, canola oil, soybean oil, or other vegetable oil to produce a phytosterol concentrate. This concentrate is then gradually blended into the butter, typically while cooling to control the temperature of the blend. For example, when combining with approximately 100 g of butter containing approximately 220 mg cholesterol, between 0.44 g and 2.2 g phytosterols (between a 2:1 and 10:1 ratio of phytosterols to cholesterol), and preferably between 0.7 g and 1.5 g phytosterols (between a 3:1 and 7:1 ratio), and more preferably approximately 1.1 g phytosterols (between a 4:1 and 6:1 ratio, such as a 5:1 ratio) is dissolved by heating with between 5 g and 40 g oil or fat. Examples of suitable oils and fats include canola oil, soybean oil and anhydrous butter fat (preferably between 10 g and 20 g of such oil or fat) which is then gradually blended with the butter, usually while churning and cooling to form the butter-based blended product. Applicants refer to this product as a butter blend, butter spread or butter (with the named added oil(s) and phytosterols).

Many other cholesterol-containing processed foods besides butter and ground meats that contain fats or oils (such as ice cream, for example) can be similarly supplemented with TRPs to compensate and functionally neutralize their endogenous cholesterol content, thereby benefiting public health.

Example 21

Weight Loss Dietary Beverages and Dietary Foods Containing Phytosterols for Reducing Plasma Cholesterol Levels in Overweight and Obese Subjects A variety of prepared foods and dietary beverages are routinely formulated and packaged for overweight and obese people to provide a balanced diet with a defined caloric intake of proteins, fats and carbohydrates. An elevated level of plasma LDL cholesterol often represents a health problem for such people as they attempt to reduce their weight. Therefore, it would be sensible to provide phytosterols particularly in weight reduction diets when excess body fat with its endogenous stores of cholesterol is being metabolized. One example of a company producing dietary formulations for weight loss is the Slim-Fast Foods Company (West Palm Beach, Fla.). This company produces a variety of shakes, meal bars, soups, pastas, and snack bars that are provided in premeasured portion packages. A survey of Slim-Fast shakes, for example, shows that the fat content may vary between approximately 3 g and 9 g per serving. These quantities of fat can conveniently serve as carriers for the quantities of non-esterified phytosterols that are recommended on a per serving basis by the Food and Drug Administration. Accordingly, before adding the prescribed amounts of fat to the formulations for dietary shakes, the fat can be combined with between approximately 400 mg and 800 mg per serving non-esterified phytosterols, and heated to a temperature sufficient to dissolve the phytosterols. The solubilized phytosterols may then be blended with the remaining ingredients for the shake. As the ingredients cool, the phytosterols co-crystallize with the fat, as a so-called TRP complex. Many other prepared food receipes and beverages provided for weight loss regimens can be formulated with TRPs providing that the receipes call for quantities of fat (per serving) that are adequate for dissolving and recrystallizing the phytosterols as taught herein. Accordingly, overweight or obese patients can benefit from regular consumption of prepared foods and beverages that include between approximately 400 mg and 800 mg per serving of non-esterified phytosterols in the form of TRPs that can reduce the level of plasma LDL cholesterol.

Unless otherwise defined herein, all terms have their ordinary meanings as understood by one of ordinary skill in the field to which the invention pertains. All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, TRPs that are constituted using other sources of phytosterols and/or fats and oils not listed herein, or TRPs incorporated into various prepared foods not listed herein, or a combination of other phytosterol sources and other prepared foods all within the scope of the present invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any 2 different values as the endpoints of a range. Such ranges are also within the scope of the described invention.

Thus, additional embodiments are within the scope of the invention and within the following claims.

TABLE 1a

Oxidation of heated (170° C.) oils with or without non-esterified sterols (Example 3a)

| | Increase in Dielectric Constant* 2 hrs |
|---|---|
| Canola oil | 1.48 |
| Canola oil + 5% Non-esterified Sterols | 1.09 |
| Conola oil + 10% Non-esterified Sterols | 0.70 |
| Soybean oil | 2.09 |

TABLE 1a-continued

Oxidation of heated (170° C.) oils with or without non-esterified sterols (Example 3a)

| | Increase in Dielectric Constant* 2 hrs |
|---|---|
| Soybean oil + 5% Non-esterified Sterols | 1.72 |
| Soybean oil + 10% Non-esterified Sterols | 1.46 |
| Cottonseed oil | 1.94 |
| Cottonseed oil + 5% Non-esterified Sterols | 1.46 |
| Cottonseed oil + 10% Non-esterified Stero | 0.85 |

*Oxidation of oils was determined using "Foodoils Sensor" which measures the dielectric constant of polar compounds formed in the oil during heating. Values indicates relative (to baseline) increases in peroxides, acids and other polar components formed in the oil during heating. The oils (5 g) were heated with or without prilled phytosterols in 100 mL beakers at 170° C.

TABLE 1b

Oxidation of heated (190° C.) canola oils with or without non-esterified sterols or stanols (Example 3b)

| | Increase in Dielectric Constant* | |
|---|---|---|
| | 2 hrs | 4 hrs |
| Canola oil | 3.22 | 7.78 |
| Canola oil + 10% Non-esterified Sterols | 2.84 | 7.33 |
| Conola oil + 10% Non-esterified Stanols | 2.23 | 6.38 |

*Oxidation of oils was determined using "Foodoils Sensor" which measures the dielectric constant of polar compounds formed in the oil during heating. Values indicates relative (to baseline) increases in peroxides, acids and other polar components formed in the oil during heating. The oil (5 g) were heated with or without prilled phytosterols in 100 mL beakers at 190° C.

TABLE 2

Composition of purified diets for gerbils (Example 6)

| | | Diet (gram per 1.0 kilo) | |
|---|---|---|---|
| INGREDIENT | % | Control (Without Phytosterols) | Non-esterified Phytosterols |
| Casein | 20 | 200 | 200 |
| Sucrose | 20 | 200 | 200 |
| Cornstarch | 29.6-28.9 | 296 | 289 |
| Cellulose | 10 | 100 | 100 |
| Fat: | 13.7 | | |
| Coconut oil | 8.1 | 81 | 81 |
| Canola | 4.3 | 43 | 43 |
| Soybean oil | 1.3 | 13 | 13 |
| Mineral mix (Ausman-Hayes) | 5.0 | 50 | 50 |
| Vitamin mix (Hayes-Cathcart) | 1.2 | 12 | 12 |
| Choline chloride | 0.3 | 3 | 3 |
| Free Phytoterols (prilled soybean) | 0.75 | 0 | 7.5 |
| Cholesterol | 0.15 | 1.5 | 1.5 |

Diets were fed as gel blocks, prepared by withholding from formulation 60 g/kg of cornstarch and premixing it with 800 mL of boiling water, to form a gel to which the remaining ingredient were added.

TABLE 3

Plasma lipids of gerbils fed for 4 weeks diets without or with non-esterified phytosterols (Example 6).

| | Diet Groups | |
|---|---|---|
| | Control (Without Phytosterols) | Non-esterified Phytosterols (Prilled Soybean) |
| Body weight (g) | | |
| initial | 53 ± 3 | 52 ± 2 |
| final | 66 ± 4 | 65 ± 3 |
| Plasma (mg/dL) | | |
| TC | 153 ± 7 | 99 ± 9* |
| TG | 33 ± 10 | 24 ± 3 |

Values are Mean ± SD (n = 5, 6)
*Significantly different (p < 0.05) from control group.

TABLE 4

Composition of purified diets for gerbils (Example 7)

| | | Diet (gram per 1.0 kilo) | |
|---|---|---|---|
| INGREDIENT | % | Chips without phytosterolsterols | Chips with free phytosterols (prilled soybean) |
| Casein | 20 | 200 | 200 |
| Dextrose | 20 | 200 | 200 |
| Cornstarch | 10.6 | 106 | 106 |
| Starch with chips | 0-19.8 | 191 | 191 |
| Cellulose | 10 | 100 | 100 |
| Fat: | 1.0-13.7 | | |
| Coconut oil | | 62 | 62 |
| Fat from chips | | 75 | 67 |
| Soybean oil | | 0 | 0 |
| Mineral mix (Ausman-Hayes) | 5.0 | 50 | 50 |
| Vitamin mix (Hayes-Cathcart) | 1.2 | 12 | 12 |
| Choline chloride | 0.3 | 3 | 3 |
| Chips prepared in canola oil | | 268 | |
| Chips prepared in canola oil w. 10% free phytosterols (soybean) | | 0 | 268 |
| Cholesterol | 0.15 | 1.5 | 1.5 |

Diets were fed as gel blocks, prepared by withholding from formulation 60 g/kg of cornstarch and premixing it with 800 mL of boiling water, to form a gel to which the remaining ingredient were added.

TABLE 5

Plasma and liver lipids of gerbils fed for 4 weeks diets with phytosterols enriched potato chips (Example 7).

| | Diet groups: | |
|---|---|---|
| | Chips Without Phytosterols | Chips With Non-esterified Phytosterols (Prilled Soybean) |
| Body weight (g) | | |
| initial | 51 ± 4 | 51 ± 2 |
| final | 66 ± 3 | 64 ± 2 |
| Liver weight (% BW) | 3.1 ± 0.1 | 2.8 ± 0.1* |
| Cecum weight (% BW) | 2.7 ± 0.5 | 2.9 ± 0.4 |
| Adipose (Perirenal) wt (% BW) | 0.32 ± 0.11 | 0.38 ± 0.07 |
| Liver cholesterol | | |
| TC (mg/g) | 39 ± 6 | 13 ± 4* |
| FC (mg/g) | 5 ± 1 | 5 ± 0 |
| EC (mg/g) | 34 ± 6 | 8 ± 4* |
| Plasma | | |
| TC (mg/dL) | 190 ± 45 | 99 ± 11* |
| TG (mg/dL) | 51 ± 9 | 44 ± 6 |
| HDL-C (mg/dL) | 68 ± 9 | 58 ± 9 |
| TC/HDL-C ratio | 2.9 ± 1.1 | 1.7 ± 0.2* |

Values are Mean ± SD (n = 5-7, liver cholesterol n = 4)
*Significantly different (p < 0.05) from control group

TABLE 6

Effect of two 1 oz bags of Tortilla chips/day, providing either 1.5 g or no phytosterols, on plasma lipids in humans for 4 wk (all subjects)

| | Tortilla chips | | | | | |
|---|---|---|---|---|---|---|
| | Chips without phytosterols | | | Chips with phytosterols | | |
| Plasma | Baseline | After 4 wk of chips | % change | Baseline | After 4 wk of chips | % change |
| TC (mg/dL) | 226 ± 34 | 223 ± 32 | minus 1.3 | 234 ± 32 | 208 ± 30* | minus 10.3 |
| TG (mg/dL) | 101 ± 52 | 103 ± 50 | plus 2.0 | 117 ± 66 | 117 ± 45 | 0 |
| HDL-C (mg/dL) | 45 ± 11 | 45 ± 11 | 0 | 45 ± 10 | 46 ± 10 | plus 2.2 |
| LDL-C (mg/dL) | 161 ± 37 | 157 ± 35 | minus 2.5 | 166 ± 42 | 141 ± 39* | minus 15.1 |
| LDL/HDL-C ratio | 4.3 ± 1.1 | 4.2 ± 0.9 | minus 2.3 | 4.0 ± 1.5 | 3.3 ± 1.3* | minus 17.5 |

Values are Mean ± SD (n = 9 – 10);
TC = total cholesterol;
TG = triglycerides;
HDL-C = high-density lipoprotein cholesterol;
LDL-C = low-density lipoprotein cholesterol;
*Significantly lower than baseline (p < 0.05) by paired t-test.

TABLE 7

Effect of two 1 oz bags Tortilla chips, providing either 1.5 g/d or no phytosterols, on plasma lipids of humans after 4 wks (crossover data only).

|  |  | Tortilla chips | | |
|---|---|---|---|---|
| Plasma | Baseline | without phytosterols | with phytosterols | % change |
| TC (mg/dL) | 232 ± 36 | 228 ± 33 | 205 ± 34* | minus 10.1 |
| TG (mg/dL) | 111 ± 52 | 110 ± 58 | 118 ± 46 | plus 7.2 |
| HDL-C (mg/dL) | 48 ± 10 | 49 ± 10 | 49 ± 10 | 0 |
| LDL-C (mg/dL) | 162 ± 41 | 157 ± 38 | 133 ± 41* | minus 15.3 |
| LDL/HDL-C ratio | 3.6 ± 1.3 | 3.4 ± 1.2 | 2.9 ± 1.2* | minus 14.7 |

Values are Mean ± SD (n = 7);
TC = total cholesterol;
TG = triglycerides;
HDL-C = high-density lipoprotein cholesterol;
LDL-C = low-density lipoprotein cholesterol;
*Significantly decrease on chips with phytosterols (p < 0.05) by paired t-test.

TABLE 8

Dietary effect of Tortilla chips, providing either 1.5 g/d or no phytosterols, on plasma levels of α- and β-carotene in humans after 4 wk crossover trial (Example 13).

|  |  | Tortilla chips crossover | | Tortilla chips with phy (change from baseline) | Tortilla chips with phy (change from tortila chips with no phy.) |
|---|---|---|---|---|---|
|  | Baseline | no phytosterols | with phytosterols | | |
| Carotene (μg/dL) | | | | | |
| α-carotene | 4.9 ± 2.8 | 4.4 ± 2.0 | 5.2 ± 3.3 | (+6%) | (+18%) |
| β-carotene | 10.8 ± 6.2 | 9.4 ± 3.0 | 9.5 ± 5.0 | (−12%) | (+1%) |
| α + β-carotene | 15.7 ± 8.3 | 13.8 ± 4.1 | 14.7 ± 8.0 | (−6%) | (+7) |
| Carotene/TC (μmol/mmol) | | | | | |
| α-carotene | 0.015 ± 0.009 | 0.014 ± 0.07 | 0.019 ± 0.011 | (+27%) | (+36%) |
| β-carotene | 0.033 + 0.020 | 0.031 ± 0.007 | 0.033 ± 0.0180 | 0 % | (+6%) |
| α + β-carotene | 0.048 ± 0.027 | 0.045 ± 0.027 | 0.052 ± 0.029 | (+8%) | (+16%) |

Values are mean ± SD (n = 7).

TABLE 9

Composition of purified diets for gerbils (Example 16).

| INGREDIENT | Diets (gram per 1.0 kilo) | | | |
|---|---|---|---|---|
|  | Control (no phytosterols or fish oil) | Phytosterols (0.75%) | Fish oil (1.75%) | Fish oil/phytosterol complex |
| Casein | 180 | 180 | 180 | 180 |
| Dextrose | 565 | 565 | 565 | 565 |
| Cornstarch | 137 | 129 | 119 | 112 |
| Fat: | | | | |
| Tallow | 30 | 30 | 30 | 30 |
| Milk fat | 12 | 12 | 12 | 12 |
| Lard | 10 | 10 | 10 | 10 |
| Fish oil | 0 | 0 | 17.5 | 17.5 |
| Phytosterols | 0 | 7.5 | 0 | 7.5 |
| Mineral mix | | | | |
| Ausman - Haye Vitamin mix | 50 | 50 | 50 | 50 |
| Hayes - Cathcal | 12 | 12 | 12 | 12 |
| Choline chloride | 3 | 3 | 3 | 3 |
| Cholesterol | 1.5 | 1.5 | 1.5 | 1.5 |

Diets were fed as gel blocks, prepared by withholding 40 g/kg of cornstarch from the formulation and premixing it with 400 ml of boiling water to form a gel to which the remaining ingredients were added.

TABLE 10

Plasma and liver lipids of gerbils fed for 4 weeks diets with phytosterols or fish oil or both (Example 16).

|  | Control (no phytosterols or fish oil) | Phytosterols (0.75%) | Fish oil (1.75%) | Fish oil/phytosterol complex |
|---|---|---|---|---|
| Body weight (g) | | | | |
| Initial | 46 ± 3 | 46 ± 3 | 46 ± 2 | 46 ± 3 |
| Final | 63 ± 4 | 62 ± 5 | 65 ± 6 | 64 ± 4 |
| Liwer weight (% BW) | 3.8 ± 0.2$^{a,b}$ | 3.5 ± 0.3$^{a,c}$ | 3.7 ± 0.3$^{d}$ | 3.2 ± 0.2$^{a,b,d}$ |
| Cecum weight (% BW) | 1.9 ± 0.3$^{a}$ | 1.9 ± 0.3$^{b}$ | 1.4 ± 0.3$^{a,b}$ | 1.6 ± 0.3 |
| Adipose (Perirenal) wt (% BW) | 0.9 ± 0.2 | 1.0 ± 0.3 | 0.9 ± 0.4 | 1.0 ± 0.2 |
| Liver cholesterol (mg/g) | | | | |
| TC | 90 ± 6$^{a,b,c}$ | 33 ± 7$^{a,d}$ | 64 ± 12$^{b,d,e}$ | 19 ± 2$^{c,d,e}$ |
| FC | 7 ± 0$^{a,b,c}$ | 6 ± 1$^{a,d}$ | 6 ± 1$^{b,e}$ | 5 ± 1$^{c,d,e}$ |
| EC | 84 ± 6$^{a,b,c}$ | 27 ± 6$^{a,d}$ | 58 ± 12$^{b,d,e}$ | 15 ± 2$^{c,d,e}$ |
| Plasma | | | | |
| TC (mg/dL) | 206 ± 29$^{a,b,c}$ | 134 ± 25$^{a,d}$ | 143 ± 25$^{b,e}$ | 90 ± 18$^{c,d,e}$ |
| TG (mg/dL) | 79 ± 20 | 101 ± 57 | 117 ± 80$^{a}$ | 63 ± 19$^{a}$ |
| HDL-C (mg/dL) | 122 ± 7$^{a,b}$ | 107 ± 21$^{c,d}$ | 84 ± 22$^{a,c,e}$ | 64 ± 11$^{b,d,e}$ |
| TC/HDL-C ratio | 1.7 ± 0.2$^{a,b}$ | 1.3 ± 0.7$^{a,c}$ | 1.8 ± 0.4$^{c,d}$ | 1.4 ± 0.1$^{b,d}$ |
| α-toc/cholesterol (mmol/mmol) | 8.9 ± 1.0$^{a,b}$ | 11.0 ± 1.0$^{a,c}$ | 9.3 ± 0.7$^{c,d}$ | 10.5 ± 0.6$^{b,d}$ |

Values are Mean ± SD (n = 9, liver cholesterol n = 4).
$^{a,b,c}$Means in a row sharing a common superscript are significantly different (p < 0.05)

TABLE 11

Effect of Tortilla chips, providing either 1.5 g/d or no phytosterols, on plasma level of lipid peroxides (TBARS) in humans after 4 wk (crossover trial)[1]

|  | Tortilla chips crossover | | Tortilla chips with phytosterols |
|---|---|---|---|
|  | without phytosterols | with phytosterols | (change from tortila chips without phy.) |
| TBARS (nmol/mL) | 9.8 ± 2.8 | 6.9 ± 1.7* | (−30%) |

[1]Values are mean ± SD, n = 7.
*Significantly lower than chips without phytosterols (p < 0.05) by paired t-test.

TABLE 12

Cholesterol and phytosterols content of breaded chicken breast (BCB) tenders fried at 355° F. for 8 min.

| Fry Fat (Fat blend* + Phytosterols) | BCB tenders before frying g | BCB tenders after frying | | | |
|---|---|---|---|---|---|
| | | Weight g | Water content g/100 g | Fat content g/100 g | cholesterol mg/100 g | Phytosterols mg/100 g |
| Fat blend with 0% Phytosterols | 100 | 72 | 39.5 | 14.0 | 55 | 0 |
| Fat blend with 1.5% Phytosterols | 100 | 72 | 39.6 | 13.6 | 55 | 74 |
| Fat blend with 3.0% Phytosterols | 100 | 70 | 40.2 | 12.8 | 57 | 252 |
| Fat blend with 4.5% Phytosterols | 100 | 72 | 37.2 | 15.6 | 55 | 443 |
| Fat blend with 6.0% Phytosterols | 100 | 70 | 35.8 | 15.6 | 57 | 550 |

*95.5% Palm olein + 3% Canola oil

What is claimed is:

1. A product comprising:
   a fat-based composition substantially free of exogenous solubilizing and dispersing agents for phytosterols, wherein said fat-based composition comprises:
   greater than 25% and less than 75% by weight of one or more triglyceride-based edible oil or fat; and
   greater than 25% and less than 75% by weight of one or more non-esterified phytosterols that have been converted to triglyceride-recrystallized phytosterols;
   wherein said product is edible;
   wherein said product is useful as a component of a dietary supplement; and
   wherein said one or more triglyceride-based edible oil or fat comprises at least 10% by weight omega-3 fatty acids.

2. The product of claim 1,
   wherein said fat-based composition is exposed to air and contains a reduced amount of oxidative by-products compared to an otherwise similar fat-based composition lacking said non-esterified phytosterols.

3. The product of claim 1, wherein said one or more triglyceride-based edible oil or fat is selected from the group consisting of vegetable oils, vegetable fats, animal oils, animal fats, and mixtures thereof.

4. The product of claim 1, wherein said one or more triglyceride-based edible oil or fat is further selected from the group consisting of safflower oil, sunflower oil, corn oil, cottonseed oil, soybean oil, canola oil, peanut oil, coconut oil cocoa butter, palm oil, palm olein, palm super-olein, palm kernel oil, algae oil, flaxseed oil, and combinations thereof.

5. The product of claim 1, wherein said one or more triglyceride-based edible oil or fat is selected from the group consisting of butter, anhydrous milk fat, tallow, lard, mutton fat, poultry fat, fish oil, and combinations thereof.

6. The product of claim 5, wherein said one or more triglyceride-based edible oil or fat is cholesterol-free or cholesterol-reduced.

7. The product of claim 1 wherein said one or more triglyceride-based edible oil or fat is selected from the group consisting of natural vegetable and animal fats, structurally rearranged or otherwise modified vegetable and animal fats, and combinations thereof.

8. The product of claim 1 wherein one or more of said one or more non-esterified phytosterols is selected from the group consisting of vegetable oil-derived phytosterols, tall oil-derived phytosterols, and combinations thereof.

9. The product of claim 1 wherein one or more of said one or more non-esterified phytosterols is selected from the group consisting of beta-sitosterol, beta-sitostanol, campesterol, campestanol, stigmasterol, stigmastanol, brassicasterol, brassicastanol, clionasterol, clionastanol, and combinations thereof.

10. The product of claim 1, wherein said triglyceride-recrystallized phytosterols are formed by heating said fat-based composition either alone or combined in said product to a temperature and for a time sufficient to dissolve said one or more non-esterified phytosterols, and subsequently cooling said fat-based composition to allow said triglyceride-recrystallized phytosterols to be formed.

11. The product of claim 1, wherein said product comprises a member selected from the group consisting of margarines, spreads, butter, frying shortenings, baking shortenings, mayonnaises, salad dressings, dairy products, nut butters, seed butters, kernel butters, peanut butter, chocolate, fried snack foods, leavened bakery products comprising a flour, potato chips, French fries, corn chips, tortilla chips, popcorn, crackers, condiments, and sauces.

12. The product of claim 11, wherein said leavened bakery product is selected from the group consisting of cakes, muffins, donuts, pastries, breads and rolls.

13. The product of claim 11, wherein said condiment is selected from the group consisting of tomato catsup, mustard, barbecue sauce, steak sauce, Worchestershire sauce, cocktail sauce, tartar sauce, and pickle relish.

14. The product of claim 11, wherein said sauce is selected from the group consisting of tomato-based pasta sauce, pizza sauce, prepared chili, and dessert sauce.

15. The product of claim 1, wherein the oxidation rate of said fat-based composition is at least 20% lower than the oxidation rate for the same one or more triglyceride-based edible oil or fat lacking phytosterols.

16. The product of claim 1 wherein said omega-3 fatty acids are selected from the group consisting of DHA, EPA, alpha-linolenic acid, and combinations thereof.

17. The product of claim 1 wherein said one or more triglyceride-based edible oil or fat is selected from the group consisting of fish oil, cholesterol-reduced fish oil cholesterol-free fish oil, algae oil, flaxseed oil, and combinations thereof.

18. The product of claim 1 wherein said fat-based composition is packaged in edible gelatin capsules.

19. A method for reducing plasma cholesterol levels in mammals, comprising:
regularly ingesting a product comprising:
a fat-based composition substantially free of exogenous solubilizing and dispersing agents for phytosterols,
wherein said fat-based composition comprises:
greater than 25% and less than 75% by weight of one or more triglyceride-based edible oil or fat; and
greater than 25% and less than 75% by weight of one or more non-esterified phytosterols that have been converted to triglyceride-recrystallized phytosterols;
wherein said product is edible;
wherein said product is useful as a component of a member of the group consisting of prepared foods, dietary supplements, and direct food additives; and
wherein the plasma concentration of carotenoids comprising alpha- and beta-carotene is maintained essentially constant while said plasma cholesterol levels are reduced.

20. The method of claim 19 wherein between 0.4 g and 4.0 g of said non-esterified phytosterols are ingested daily by humans.

21. The method of claim 19 wherein said triglyceride-recrystallized phytosterols arc formed by heating said one or more triglyceride-based edible oil or fat and said one or more non-esterified phytosterols to a temperature of at least 60° C. for a period of time sufficient to dissolve said non-esterified phytosterols, and subsequently cooling said composition to room temperature to cause said triglyceride-recrystallized phytosterols to be formed.

22. A method for reducing plasma cholesterol levels in mammals, comprising:
regularly ingesting a product comprising:
a fat-based composition substantially free of exogenous solubilizing and dispersing agents for phytosterols,
wherein said fat-based composition comprises:
greater than 25% and less than 75% by weight of one or more triglyceride-based edible oil or fat; and
greater than 25% and less than 75% by weight of one or more non-esterified phytosterols that have been converted to triglyceride-recrystallized phytosterols;
wherein said product is edible;
wherein said product is useful as a component of a member of the group consisting of prepared foods, dietary supplements, and direct food additives;
wherein said one or more triglyceride-based edible oil or fat comprises at least 10% by weight omega-3 fatty acids comprising DHA or DHA in combination with EPA, and wherein the levels of plasma triglycerides and cholesterol are simultaneously reduced.

23. A method for protecting plasma lipoproteins and cholesterol from oxidation in mammals, comprising:
regularly ingesting a product comprising:
a fat-based composition substantially free of exogenous solubilizing and dispersing agents for phytosterols,
wherein said fat-based composition comprises:
greater than 25% and less than 75% by weight of one or more triglyceride-based edible oil or fat; and
greater than 25% and less than 75% by weight of one or more non-esterified phytosterols that have been converted to triglyceride-recrystallized phytosterols;
wherein said product is edible; and
wherein said product is useful as a component of a member of the group consisting of prepared foods, dietary supplements, and direct food additives.

24. The method of claim 23 wherein between 0.4 g and 4.0 g of said non-esterified phytosterols are ingested daily by humans.

25. The method of claim 23 wherein said triglyceride-recrystallized phytosterols are formed by heating said one or more triglyceride-based edible oil or fat and said one or more non-esterified phytosterols to a temperature of at least 60° C.

for a period of time sufficient to dissolve said non-esterified phytosterols, and subsequently cooling said composition to room temperature to cause said triglyceride-recrystallized phytosterols to be formed.

26. A product comprising:
a fat-based composition substantially free of exogenous solubilizing and dispersing agents for phytosterols, wherein said fat-based composition comprises:
greater than 25% and less than 75% by weight of one or more triglyceride-based edible oil or fat; and
greater than 50% and less than 75% by weight of one or more non-esterified phytosterols that have been converted to triglyceride-recrystallized phytosterols.

27. The product of claim 26,
wherein said fat-based composition comprises greater than 60% and less than 75% by weight of one or more non-esterified phytosterols that have been converted to triglyceride-recrystallized phytosterols.

28. The product of claim 26,
wherein said product is edible;
wherein said product is useful as a component of a member of the group consisting of prepared foods, dietary supplements, and direct food additives.

29. The product of claim 28, useful as a dietary supplement wherein said one or more triglyceride-based edible oil or fat comprises at least 10% by weight omega-3 fatty acids.

30. The product of claim 29, wherein said omega-3 fatty acids are selected from the group consisting of DHA, EPA, alpha-linolenic acid, and combinations thereof.

31. The product of claim 29, wherein said one or more triglyceride-based edible oil or fat is selected from the group consisting of fish oil, cholesterol-reduced fish oil, cholesterol-free fish oil, algae oil, flaxseed oil, and combinations thereof.

32. The product of claim 29, wherein said fat-based composition is packaged in edible gelatin capsules.

33. The product of claim 26,
wherein said fat-based composition is exposed to air and contains a reduced amount of oxidative by-products compared to an otherwise similar fat-based composition lacking said non-esterified phytosterols.

34. The product of claim 26, wherein said one or more triglyceride-based edible oil or fat is selected from the group consisting of vegetable oils, vegetable fats, animal oils, animal fats, and mixtures thereof.

35. The product of claim 26, wherein said one or more triglyceride-based edible oil or fat is further selected from the group consisting of safflower oil, sunflower oil, corn oil, cottonseed oil, soybean oil, canola oil, peanut oil, coconut oil, cocoa butter, palm oil, palm olein, palm super-olein, palm kernel oil, algae oil, flaxseed oil, and combinations thereof.

36. The product of claim 26, wherein said one or more triglyceride-based edible oil or fat is selected from the group consisting of butter, anhydrous milk fat, tallow, lard, mutton fat, poultry fat, fish oil, and combinations thereof.

37. The product of claim 36, wherein said one or more triglyceride-based edible oil or fat is cholesterol-free or cholesterol-reduced.

38. The product of claim 26, wherein said one or more triglyceride-based edible oil or fat is selected from the group consisting of natural vegetable and animal fats, structurally rearranged or otherwise modified vegetable and animal fats, and combinations thereof.

39. The product of claim 26, wherein one or more of said one or more non-esterified phytosterols is selected from the group consisting of vegetable oil-derived phytosterols, tall oil-derived phytosterols, and combinations thereof.

40. The product of claim 26, wherein one or more of said one or more non-esterified phytosterols is selected from the group consisting of beta-sitosterol, beta-sitostanol, campesterol, campestanol, stigmasterol, stigmastanol, brassicasterol, brassicastanol, clionasterol, chonastanol, and combinations thereof.

41. The product of claim 26, wherein said triglyceride-recrystallized phytosterols are formed by heating said fat-based composition either alone or combined in said product to a temperature and for a time sufficient to dissolve said one or more non-esterified phytosterols, and subsequently cooling said fat-based composition to allow said triglyceride-recrystallized phytosterols to be formed.

42. The product of claim 26, wherein said product comprises a member selected from the group consisting of margarines, spreads, butter, flying shortenings, baking shortenings, mayonnaises, salad dressings, dairy products, nut butters, seed butters, kernel butters, peanut butter, chocolate, fried snack foods, leavened bakery products comprising a flour, potato chips, French fries, corn chips, tortilla chips, popcorn, crackers, condiments, and sauces.

43. The product of claim 42, wherein said leavened bakery product is selected from the group consisting of cakes, muffins, donuts, pastries, breads and rolls.

44. The product of claim 42, wherein said condiment is selected from the group consisting of tomato catsup, mustard, barbecue sauce, steak sauce, Worchestershire sauce, cocktail sauce, tartar sauce, and pickle relish.

45. The product of claim 42, wherein said sauce is selected from the group consisting of tomato-based pasta sauce, pizza sauce, prepared chili, and dessert sauce.

46. The product of claim 26, wherein the oxidation rate of said fat-based composition is at least 20% lower than the oxidation rate for the same one or more triglyceride-based edible oil or fat lacking phytosterols.

* * * * *

UNITED STATES PATENT AND TRADEMARK OFFICE
CERTIFICATE OF CORRECTION

| | | |
|---|---|---|
| PATENT NO. | : 7,575,768 B2 | Page 1 of 1 |
| APPLICATION NO. | : 11/222512 | |
| DATED | : August 18, 2009 | |
| INVENTOR(S) | : Perlman et al. | |

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 644 days Delete the phrase "by 644 days" and insert -- by 989 days --

Signed and Sealed this

Sixth Day of April, 2010

David J. Kappos
*Director of the United States Patent and Trademark Office*